United States Patent
Sapugay et al.

(10) Patent No.: US 11,681,877 B2
(45) Date of Patent: Jun. 20, 2023

(54) SYSTEMS AND METHOD FOR VOCABULARY MANAGEMENT IN A NATURAL LEARNING FRAMEWORK

(71) Applicant: ServiceNow, Inc., Santa Clara, CA (US)

(72) Inventors: Edwin Sapugay, Foster City, CA (US); Anil Kumar Madamala, Sunnyvale, CA (US); Maxim Naboka, Santa Clara, CA (US); Srinivas SatyaSai Sunkara, Sunnyvale, CA (US); Lewis Savio Landry Santos, Santa Clara, CA (US); Murali B. Subbarao, Saratoga, CA (US)

(73) Assignee: ServiceNow, Inc., Santa Clara, CA (US)

( * ) Notice: Subject to any disclaimer, the term of this patent is extended or adjusted under 35 U.S.C. 154(b) by 177 days.

(21) Appl. No.: 17/249,759

(22) Filed: Mar. 11, 2021

(65) Prior Publication Data
US 2021/0200960 A1    Jul. 1, 2021

Related U.S. Application Data

(63) Continuation of application No. 16/356,815, filed on Mar. 18, 2019, now Pat. No. 10,956,683.
(Continued)

(51) Int. Cl.
*G06F 40/30* (2020.01)
*G06N 20/00* (2019.01)
(Continued)

(52) U.S. Cl.
CPC ........... *G06F 40/30* (2020.01); *G06F 40/205* (2020.01); *G06F 40/211* (2020.01); *G06N 5/022* (2013.01);
(Continued)

(58) Field of Classification Search
CPC .... G06F 40/205; G06F 40/211; G06F 40/216; G06F 40/237; G06F 40/284; G06F 40/30;
(Continued)

(56) References Cited

U.S. PATENT DOCUMENTS 5,237,503 A * 8/1993 Bedecarrax ........... G06F 40/247
704/10
6,321,229 B1   11/2001 Goldman
(Continued)

*Primary Examiner* — Gerald Gauthier
(74) *Attorney, Agent, or Firm* — Fletcher Yoder PC

(57) ABSTRACT

An agent automation system implements a virtual agent that is capable of learning new words, or new meanings for known words, based on exchanges between the virtual agent and a user in order to customize the vocabulary of the virtual agent to the needs of the user or users. The agent automation framework has access to a corpus of previous exchanges between the virtual agent and the user, such as one or more chat logs. New words and/or new meanings for known words are identified within the corpus and new word vectors are generated for these new words and/or new meanings for known words and added to refine a word vector distribution model. The refined word vector distribution model is then utilized by the agent automation system to interact with the user.

17 Claims, 14 Drawing Sheets

Related U.S. Application Data

(60) Provisional application No. 62/659,710, filed on Apr. 19, 2018, provisional application No. 62/657,751, filed on Apr. 14, 2018, provisional application No. 62/652,903, filed on Apr. 5, 2018, provisional application No. 62/646,917, filed on Mar. 23, 2018, provisional application No. 62/646,916, filed on Mar. 23, 2018.

(51) Int. Cl.
*G10L 15/19* (2013.01)
*G10L 15/22* (2006.01)
*G06N 5/022* (2023.01)
*G06F 40/205* (2020.01)
*G06F 40/211* (2020.01)
*G10L 15/18* (2013.01)
*G10L 15/16* (2006.01)

(52) U.S. Cl.
CPC .............. *G06N 20/00* (2019.01); *G10L 15/19* (2013.01); *G10L 15/22* (2013.01); *G10L 15/16* (2013.01); *G10L 15/1807* (2013.01); *G10L 15/1822* (2013.01); *G10L 2015/223* (2013.01); *G10L 2015/225* (2013.01)

(58) Field of Classification Search
CPC ...... G06F 40/35; G06F 40/247; G06F 40/295; G06F 40/44; G06F 40/55; G06N 3/006; G06N 5/022; G06N 5/025; G06N 20/00; G10L 15/16; G10L 15/1807; G10L 15/1822; G10L 15/19; G10L 15/22; G10L 25/48; G10L 2015/223; G10L 2015/225; G10L 15/1815; H04L 51/02; H04M 3/4936; G16H 40/63
See application file for complete search history.

(56) References Cited

U.S. PATENT DOCUMENTS

| | | |
|---|---|---|
| 6,609,122 B1 | 8/2003 | Ensor |
| 6,658,627 B1 * | 12/2003 | Gallup .................. G06F 40/55 |
| | | 715/236 |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,509,653 B2 | 3/2009 | Das et al. |
| 7,610,189 B2 | 10/2009 | Mackie |
| 7,610,512 B2 | 10/2009 | Gerber |
| 7,617,073 B2 | 11/2009 | Trinon |
| 7,617,500 B2 | 11/2009 | Astl et al. |
| 7,624,007 B2 * | 11/2009 | Bennett .................. G06F 40/237 |
| | | 707/999.005 |
| 7,630,784 B2 | 12/2009 | Hunt et al. |
| 7,653,650 B2 | 1/2010 | Kulkarni et al. |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,849,201 B1 | 12/2010 | Subbarao et al. |
| 7,890,802 B2 | 2/2011 | Gerber |
| 3,006,240 A1 | 4/2011 | Bhatkhande et al. |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,958,031 B2 | 6/2011 | Hunt et al. |
| 7,966,398 B2 | 6/2011 | Wiles |
| 7,971,147 B2 | 6/2011 | Subbarao et al. |
| 3,051,164 A1 | 11/2011 | Peuter |
| 8,082,222 B2 | 12/2011 | Rangarajan |
| 8,112,354 B2 | 2/2012 | Lalwani et al. |
| 8,156,479 B2 | 4/2012 | Fong et al. |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,433,654 B2 | 4/2013 | Subbarao et al. |
| 8,457,928 B2 | 6/2013 | Dang |
| 8,473,361 B2 | 6/2013 | Subbarao et al. |
| 8,478,569 B2 | 7/2013 | Scarpelli |
| 8,554,750 B2 | 10/2013 | Rangaranjan |
| 8,606,581 B1 | 12/2013 | Quast |
| 8,612,289 B2 | 12/2013 | Subbarao et al. |
| 8,612,408 B2 | 12/2013 | Trinon |
| 8,646,093 B2 | 2/2014 | Myers |
| 8,650,078 B2 | 2/2014 | Subbarao et al. |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,626,717 B2 | 4/2017 | Sapugay et al. |
| 9,633,004 B2 | 4/2017 | Giuli et al. |
| 9,645,833 B2 | 5/2017 | Mueller |
| 9,654,473 B2 | 5/2017 | Miller |
| 9,659,051 B2 | 5/2017 | Hutchins |
| 9,697,828 B1 | 7/2017 | Prasad |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 9,852,165 B2 | 12/2017 | Morozov |
| 9,911,650 B2 | 3/2018 | Seeker-Walker |
| 10,002,203 B2 | 6/2018 | George |
| 10,303,771 B1 | 5/2019 | Jezewski |
| 10,360,305 B2 | 7/2019 | Larcheveque |
| 10,394,950 B2 | 8/2019 | Bethard |
| 10,409,913 B2 | 9/2019 | Bhatt |
| 10,593,346 B2 | 3/2020 | Van Gysel |
| 10,657,328 B2 | 5/2020 | Bellegarda |
| 10,733,375 B2 | 8/2020 | Li |
| 10,733,982 B2 | 8/2020 | Grupen |
| 10,811,013 B1 | 10/2020 | Seeker-Walker |
| 11,101,037 B2 * | 8/2021 | Allen ..................... G16H 40/67 |
| 2002/0103837 A1 * | 8/2002 | Balchandran ........... G06F 40/30 |
| | | 715/264 |
| 2004/0230415 A1 * | 11/2004 | Riezler ................. G06F 40/216 |
| | | 704/5 |
| 2005/0075874 A1 | 4/2005 | Balchandran |
| 2006/0047649 A1 | 3/2006 | Liang |
| 2006/0106793 A1 | 5/2006 | Liang |
| 2006/0130038 A1 | 6/2006 | Claussen et al. |
| 2007/0261065 A1 | 11/2007 | Astl et al. |
| 2008/0059188 A1 | 3/2008 | Konopka |
| 2008/0075444 A1 | 3/2008 | Subbarao et al. |

(56) References Cited

U.S. PATENT DOCUMENTS

| | | | |
|---|---|---|---|
| 2009/0192787 A1* | 7/2009 | Roon | G06F 40/216 715/256 |
| 2010/0063796 A1* | 3/2010 | Rehberg | G06F 40/30 704/9 |
| 2010/0082331 A1* | 4/2010 | Brun | G06F 40/205 704/9 |
| 2011/0113069 A1 | 5/2011 | Morgan | |
| 2011/0238408 A1 | 9/2011 | Larcheveque | |
| 2012/0246073 A1 | 9/2012 | Gore et al. | |
| 2012/0290938 A1 | 11/2012 | Subbarao et al. | |
| 2014/0081625 A1* | 3/2014 | Wilensky | G10L 15/22 704/275 |
| 2014/0095418 A1 | 4/2014 | Scholand | |
| 2014/0279274 A1 | 9/2014 | Subbarao et al. | |
| 2014/0289236 A1 | 9/2014 | Agarwal | |
| 2014/0297457 A1 | 10/2014 | Sapugay et al. | |
| 2014/0297458 A1 | 10/2014 | Sapugay et al. | |
| 2014/0316764 A1* | 10/2014 | Ayan | H04M 3/4936 704/9 |
| 2014/0337266 A1 | 11/2014 | Kains | |
| 2014/0337814 A1 | 11/2014 | Kains | |
| 2014/0365209 A1* | 12/2014 | Evermann | G06F 40/35 704/9 |
| 2015/0143245 A1 | 5/2015 | Waldman | |
| 2015/0261744 A1* | 9/2015 | Suenbuel | G06F 40/211 704/9 |
| 2015/0269573 A1 | 9/2015 | Subbarao et al. | |
| 2015/0363384 A1* | 12/2015 | Williams | G06F 40/30 704/9 |
| 2016/0099892 A1 | 4/2016 | Palakovich | |
| 2016/0132605 A1 | 5/2016 | Jiang | |
| 2016/0179787 A1* | 6/2016 | Deleeuw | G10L 15/22 704/9 |
| 2016/0180728 A1 | 6/2016 | Clark | |
| 2016/0299885 A1 | 10/2016 | Emanuel | |
| 2016/0307564 A1 | 10/2016 | Sethy | |
| 2016/0350290 A1 | 12/2016 | Fujiwara | |
| 2017/0053646 A1 | 2/2017 | Watanabe | |
| 2017/0060848 A1* | 3/2017 | Liu | G06F 40/295 |
| 2017/0103329 A1 | 4/2017 | Reddy | |
| 2017/0160813 A1 | 6/2017 | Divakaran | |
| 2017/0286403 A1 | 10/2017 | Popescu | |
| 2017/0329761 A1 | 11/2017 | Linta | |
| 2017/0364586 A1 | 12/2017 | Krishnamurthy | |
| 2017/0371861 A1 | 12/2017 | Barborak | |
| 2018/0052664 A1 | 2/2018 | Zhang | |
| 2018/0053119 A1 | 2/2018 | Zeng | |
| 2018/0075846 A1* | 3/2018 | Gandrabur | G06F 40/30 |
| 2018/0082032 A1* | 3/2018 | Allen | G16H 40/63 |
| 2018/0190272 A1 | 7/2018 | Georges | |
| 2018/0225568 A1 | 8/2018 | Chandramouli | |
| 2018/0234550 A1 | 8/2018 | Lifson | |
| 2018/0239822 A1* | 8/2018 | Reshef | G06F 40/284 |
| 2018/0307677 A1 | 10/2018 | Jiang | |
| 2018/0314689 A1 | 11/2018 | Wang | |
| 2019/0042559 A1 | 2/2019 | Allen | |
| 2019/0079753 A1 | 3/2019 | Makkar | |
| 2019/0079754 A1 | 3/2019 | Makkar | |
| 2019/0088151 A1 | 3/2019 | Chen | |
| 2019/0103111 A1 | 4/2019 | Tiwari | |
| 2019/0103982 A1 | 4/2019 | Brunn | |
| 2019/0197103 A1 | 6/2019 | Kroner | |
| 2019/0243899 A1 | 8/2019 | Yi | |
| 2019/0294678 A1* | 9/2019 | Sapugay | G06N 5/025 |
| 2021/0200960 A1* | 7/2021 | Sapugay | G06F 40/211 |
| 2022/0229994 A1* | 7/2022 | Sharma | H04L 51/02 |
| 2022/0238103 A1* | 7/2022 | Madhusudhan | G06F 40/30 |

\* cited by examiner

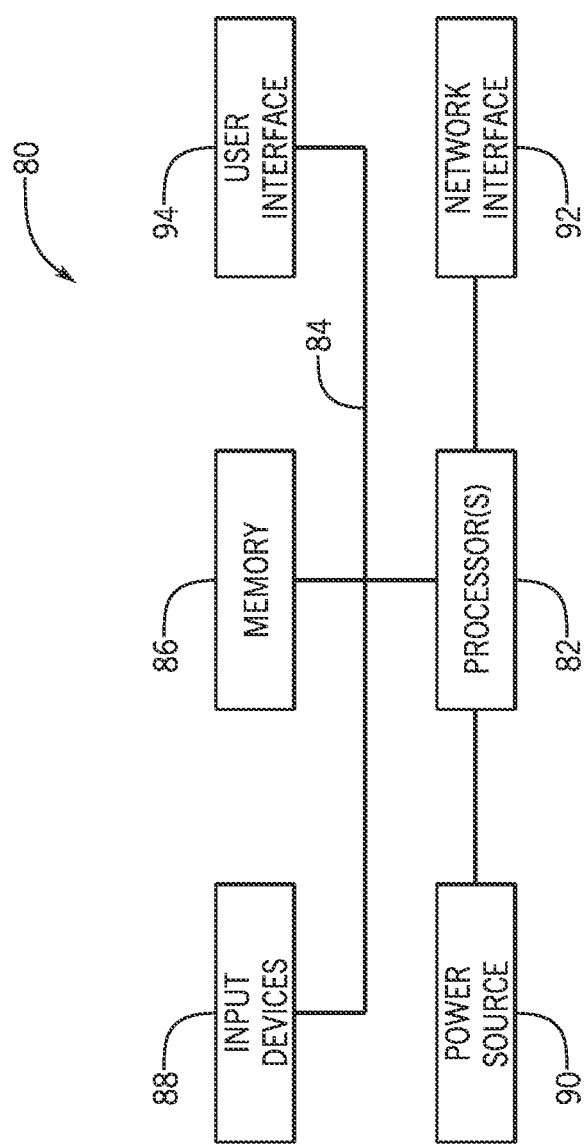

SYSTEMS AND METHOD FOR VOCABULARY MANAGEMENT IN A NATURAL LEARNING FRAMEWORK

CROSS-REFERENCE

This application is a continuation of U.S. application Ser. No. 16/356,815, entitled, "SYSTEMS AND METHOD FOR VOCABULARY MANAGEMENT IN A NATURAL LEARNING FRAMEWORK," filed Mar. 18, 2019, which claims priority from and the benefit of U.S. Provisional Application No. 62/646,915, entitled "HYBRID LEARNING SYSTEM FOR NATURAL LANGUAGE UNDERSTANDING," filed Mar. 23, 2018; U.S. Provisional Application No. 62/646,916, entitled "VOCABULARY MANAGEMENT IN A NATURAL LEARNING FRAMEWORK," filed Mar. 23, 2018; U.S. Provisional Application No. 62/646,917, entitled "METHOD AND SYSTEM FOR AUTOMATED INTENT MINING, CLASSIFICATION AND DISPOSITION," filed Mar. 23, 2018; U.S. Provisional Application No. 62/657,751, entitled "METHOD AND SYSTEM FOR FOCUSED CONVERSATION CONTEXT MANAGEMENT IN A BEHAVIOR ENGINE," filed Apr. 14, 2018; U.S. Provisional Application No. 62/652,903, entitled "TEMPLATED RULE-BASED DATA AUGMENTATION FOR INTENT EXTRACTION FROM SPARSE DATA," filed Apr. 5, 2018; and U.S. Provisional Application No. 62/659,710, entitled "WRITTEN-MODALITY PROSODY SUBSYSTEM IN A NLU FRAMEWORK," filed Apr. 19, 2018, which are incorporated by reference herein in their entirety for all purposes.

BACKGROUND

The present disclosure relates generally to the fields of natural language understanding (NLU) and artificial intelligence (AI), and more specifically, to managing the known vocabulary of a hybrid learning system for NLU.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations and these resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Such a cloud computing service may host a virtual agent, such as a chat agent, that is designed to automatically respond to issues with the client instance based on natural language requests received from a user of the client instance. For example, a user may provide a request to a virtual agent for assistance with a password issue, wherein the virtual agent is part of a Natural Language Processing (NLP) or Natural Language Understanding (NLU) system. NLP is a general area of computer science and AI that involves some form of processing of natural language input. Examples of areas addressed by NLP include language translation, speech generation, parse tree extraction, part-of-speech identification, and others. NLU is a sub-area of NLP that specifically focuses on understanding user utterances. Examples of areas addressed by NLU include question-answering (e.g., reading comprehension questions), article summarization, and others. For example, a NLU system may use algorithms to reduce human language (e.g., spoken or written) into a set of known symbols for consumption by a downstream virtual agent. NLP is generally used to interpret free text for further analysis. Current approaches to NLP are typically based on deep learning, which is a type of AI that examines and uses patterns in data to improve the understanding of a program.

Virtual agents may be implemented in a wide range of applications for a wide range of customers or clients. For example, virtual agents may be utilized by organizations in retail, manufacturing, accounting, consumer product development and/or sales, software development, information technology services, social media, consulting, engineering, banking, oil and gas, insurance, real estate, commercial equipment sales, media, healthcare, construction, legal services, transportation, pharmaceuticals, marketing, etc. Further, these virtual agents may engage with users within these organizations in a wide variety of roles, such as executives, information technology (IT) professionals, assistants, engineers, attorneys, doctors, nurses, technicians, accountants, human resources professionals, analysts, software developers, janitors, etc. Dependent upon the particular application and the particular users, a given instantiation of the virtual agent may utilize vocabulary terms that may be specific to that application and/or the specific users of the virtual agent. As such, it is presently recognized that there is a need to customize the vocabulary of virtual agents to the particular industries and users they will serve.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to an agent automation framework that is capable of extracting meaning from user utterances, such as requests received by a virtual agent (e.g., a chat agent), suitably responding to these user utterances, and learning new vocabulary words, or new meanings for known words, as time passes and exchanges between the chat agent and the user occur.

The agent automation framework includes a NLU framework and an intent/entity model having defined intents and entities that are associated with sample utterances. The NLU framework includes a meaning extraction subsystem that is designed to generate meaning representations for the sample utterances of the intent/entity model, as well as a meaning representation for a received user utterance. Additionally, the disclosed NLU framework includes a meaning search subsystem that is designed to search the meaning representations of the intent/entity model to locate matches for a meaning representation of a received user utterance. As such, present embodiments generally address the hard problem posed by NLU by transforming it into a manageable search problem.

In present embodiments, a meaning representation can be generated from an annotated utterance tree structure having a form or shape that represents the grammatical structures of the utterance, and having nodes that each represent words or phrases of the utterances as word vectors encoding the semantic meaning of the utterance. The meaning extraction subsystem includes a vocabulary subsystem, a structure subsystem, and a prosody subsystem that cooperate to parse utterances into the annotated utterance trees based on combinations of rule-based methods and machine learning (ML)-based (e.g., statistical) methods. Using one or more tree substructure vectorization algorithms and focus/attention/magnification (FAM) coefficients defined by a stored compilation model template, the meaning extraction subsystem subsequently generates subtree vectors for the annotated utterance tree structure, yielding the corresponding meaning representation for subsequent searching by the meaning search subsystem.

In present embodiments, the virtual agent is capable of learning new words, or new meanings for known words, based on exchanges between the virtual agent and the user in order to customize the vocabulary of the virtual agent to the needs of the user or users. Specifically, the agent automation framework may have access to a corpus of previous exchanges between the virtual agent and the user, such as one or more chat logs. The agent automation framework may segment the chat logs into utterances using the prosody subsystem. The utterances may then be further segmented into words and/or phrases. The agent automation framework may then recognize new words and/or new meanings for known words. New word vectors may then be generated for these new words and/or new meanings for known words. The new word vectors may then be added to an existing word vector distribution model of the vocabulary subsystem to generate a refined word vector distribution model. The new word vector may be generated, for example, based on the context in which the new word or meaning was used over one or more uses in the chat logs, input from a user, or some other source. The NLU framework may then utilize the refined word vector distribution model to interpret and analyze user utterances and generate responses.

In interpreting and analyzing user utterances, the user utterance may include a word or phrase for which there are multiple word vectors corresponding to multiple respective known meanings for the word. In order to identify the intended meaning, the agent automation framework segments the utterance into words and/or phrases. The words and/or phrases may then be pre-processed by, for example, applying directives and/or instructions from the vocabulary model. Pre-processing may include checking spelling, correcting formatting issues, expanding contractions, expanding abbreviations, replacing acronyms with associated words, as well as other data-cleansing processes. If word usage context is available, the agent automation framework may determine which meaning was intended by performing context-based disambiguation via an ontology service and/or the structure service. If no context is available, the agent automation framework may extract word vectors matching the surface form or form derivatives. If no word vectors are found, the agent automation framework derives semantic word vectors according to null-word rules. The vectors are then post-processed before being output. Post-processing may include, for example, extracting a representative vector or vector set given one or more synonymic vector lists. As time passes and the virtual agent exchanges utterances with the user, the virtual agent learns new words, or new meanings for known words, and thus customizes its vocabulary to its specific application and users.

BRIEF DESCRIPTION OF THE DRAWINGS

Various aspects of this disclosure may be better understood upon reading the following detailed description and upon reference to the drawings in which:

FIG. 3 is a block diagram of a computing device utilized in a computing system that may be present in FIG. 1 or 2, in accordance with aspects of the present techniques;

DETAILED DESCRIPTION OF SPECIFIC EMBODIMENTS

Figure 1:
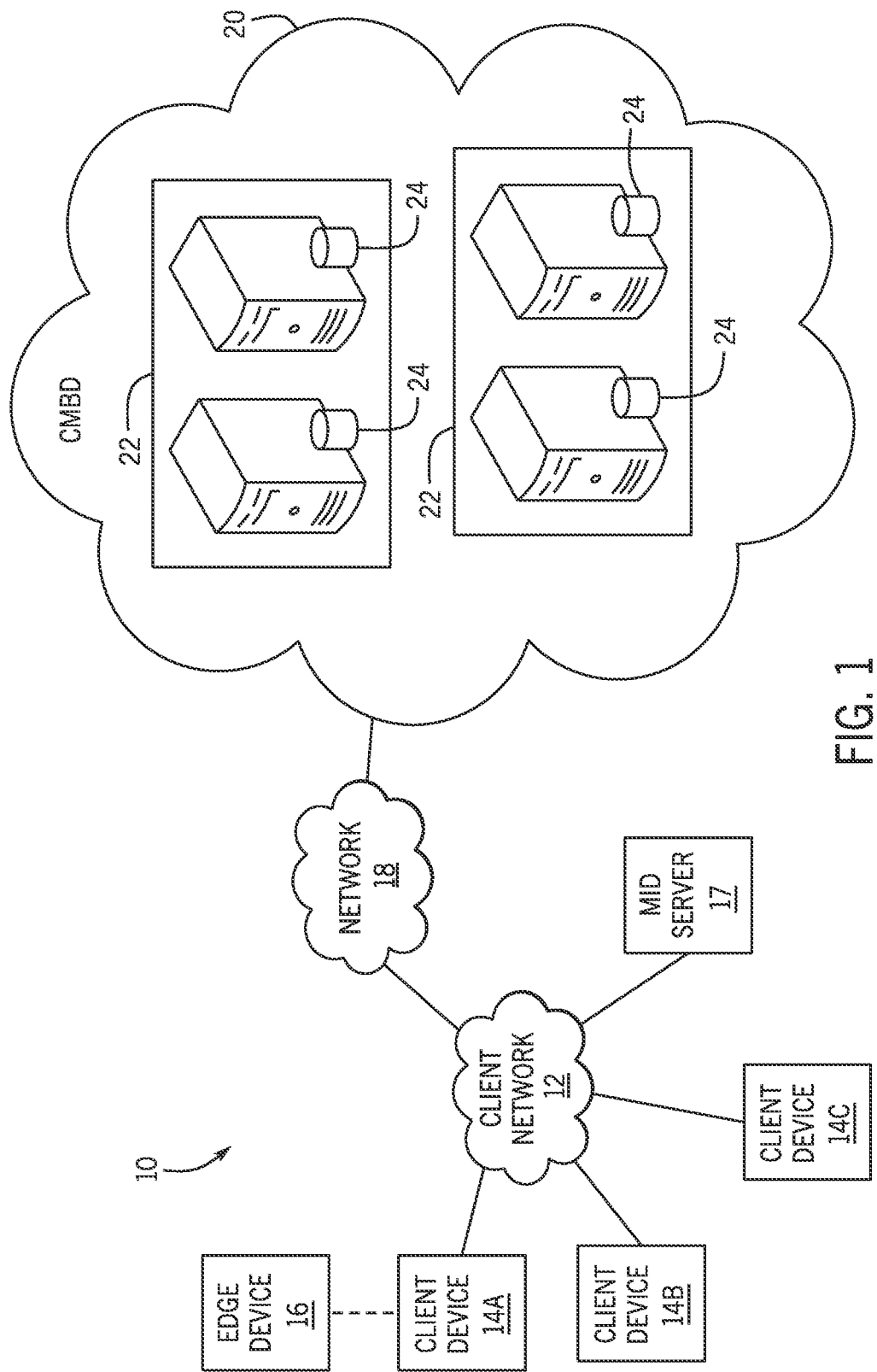
FIG. 1 is a block diagram of an embodiment of a cloud computing system in which embodiments of the present techniques may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" or "computing device" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "machine-readable medium" may include a single medium or multiple media (e.g., a centralized or distributed database, and/or associated caches and servers) that store one or more instructions or data structures. The term "non-transitory machine-readable medium" shall also be taken to include any tangible medium that is capable of storing, encoding, or carrying instructions for execution by the computing system and that cause the computing system to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

As used herein, the terms "application" and "engine" refer to one or more sets of computer software instructions (e.g., computer programs and/or scripts) executable by one or more processors of a computing system to provide particular functionality. Computer software instructions can be written in any suitable programming languages, such as C, C++, C #, Pascal, Fortran, Perl, MATLAB, SAS, SPSS, JavaScript, AJAX, and JAVA. Such computer software instructions can comprise an independent application with data input and data display modules. Alternatively, the disclosed computer software instructions can be classes that are instantiated as distributed objects. The disclosed computer software instructions can also be component software, for example JAVABEANS or ENTERPRISE JAVABEANS. Additionally, the disclosed applications or engines can be implemented in computer software, computer hardware, or a combination thereof.

As used herein, the term "framework" refers to a system of applications and/or engines, as well as any other supporting data structures, libraries, modules, and any other supporting functionality, that cooperate to perform one or more overall functions. In particular, a "natural language understanding framework" or "NLU framework" comprises a collection of computer programs designed to process and derive meaning (e.g., intents, entities) from natural language utterances based on an intent/entity model. As used herein, a "reasoning agent/behavior engine" or "RA/BE" refers to a rule-based agent, such as a virtual agent, designed to interact with other users based on a conversation model. For example, a "virtual agent" may refer to a particular example of a RA/BE that is designed to interact with users via natural language requests in a particular conversational or communication channel. With this in mind, the terms "virtual agent" and "RA/BE" are used interchangeably herein. By way of specific example, a virtual agent may be or include a chat agent that interacts with users via natural language requests and responses in a chat room environment. Other examples of virtual agents may include an email agent, a forum agent, a ticketing agent, a telephone call agent, and so forth, which interact with users in the context of email, forum posts, and autoreplies to service tickets, phone calls, and so forth.

As used herein, an "intent" refers to a desire or goal of an agent which may relate to an underlying purpose of a communication, such as an utterance. As used herein, an "entity" refers to an object, subject, or some other parameterization of an intent. It is noted that, for present embodiments, entities are treated as parameters of a corresponding intent. More specifically, certain entities (e.g., time and location) may be globally recognized and extracted for all intents, while other entities are intent-specific (e.g., merchandise entities associated with purchase intents) and are generally extracted only when found within the intents that define them. As used herein, an "intent/entity model" refers to an intent model that associates particular intents with particular sample utterances, wherein certain entity data may be encoded as a parameter of the intent within the model. As used herein, the term "agents" may refer to computer-generated personas (e.g. chat agents or other virtual agents) that interact with one another within a conversational channel. As used herein, a "corpus" refers to a captured body of source data that includes interactions between various users and virtual agents, wherein the interactions include communications or conversations within one or more suitable types of media (e.g., a help line, a chat room or message string, an email string).

As used herein, "source data" may include any suitable captured interactions between various agents, including but not limited to, chat logs, email strings, documents, help documentation, frequently asked questions (FAQs), forum entries, items in support ticketing, recordings of help line calls, and so forth. As used herein, an "utterance" refers to a single natural language statement made by a user or agent that may include one or more intents. As such, an utterance may be part of a previously captured corpus of source data, and an utterance may also be a new statement received from a user as part of an interaction with a virtual agent. As used herein, "machine learning" or "ML" may be used to refer to any suitable statistical form of artificial intelligence capable of being trained using machine learning techniques, including supervised, unsupervised, and semi-supervised learning techniques. For example, in certain embodiments, ML techniques may be implemented using a neural network (NN) (e.g., a deep neural network (DNN), a recurrent neural network (RNN), a recursive neural network). As used herein, a "vector" (e.g., a word vector, an intent vector, a subject vector, a subtree vector) refers to a linear algebra vector that is an ordered n-dimensional list (e.g., a 300 dimensional list) of floating point values (e.g., a 1×N or an N×1 matrix) that provides a mathematical representation of the semantic meaning of a portion (e.g., a word or phrase, an intent, an entity) of an utterance.

A computing platform may include a chat agent, or another similar virtual agent, that is designed to respond to user requests to perform functions or address issues on the platform. There are two predominant technologies in NLU, namely traditional computational linguistics and newer machine learning (ML) methods. It is presently recognized that these two technologies demonstrate different strengths and weaknesses with respect to NLU. For example, traditional computational linguistic methods, also referred to herein as "rule-based" methods, include precision rule-sets and manually-crafted ontologies that enable precise adjudication of linguistic structure and semantic understanding to derive meaning representations. Traditional cognitive linguistic techniques also include the concept of construction grammars, in which an aspect of the meaning of a natural language utterance can be determined based on the form (e.g., syntactic structure) of the utterance. Therefore, rule-based methods offer results that are easily explainable and customizable. However, it is presently recognized that such rule-based methods are not particularly robust to natural language variation or adept at adapting to language evolution. As such, it is recognized that rule-based methods alone are unable to effectively react to (e.g., adjust to, learn from) data-driven trends, such as learning from chat logs and other data repositories. Furthermore, rule-based methods involve the creation of hand-crafted rules that can be cumbersome, wherein these rules usually are domain specific and are not easily transferable to other domains.

On the other hand, ML-based methods, perform well (e.g., better than rule-based methods) when a large corpus of natural language data is available for analysis and training. The ML-based methods have the ability to automatically "learn" from the data presented to recall over "similar" input. Unlike rule-based methods, ML-based methods do not involve cumbersome hand-crafted features-engineering, and ML-based methods can support continued learning (e.g., entrenchment). However, it is recognized that ML-based methods struggle to be effective when the size of the corpus is insufficient. Additionally, ML-based methods are opaque (e.g., not easily explained) and are subject to biases in source data. Furthermore, while an exceedingly large corpus may be beneficial for ML training, source data may be subject to privacy considerations that run counter to the desired data aggregation.

Accordingly, present embodiments are generally directed toward an agent automation framework capable of applying a combination rule-based and ML-based cognitive linguistic techniques to leverage the strengths of both techniques in extracting meaning from natural language utterances. More specifically, present embodiments are directed to generating suitable meaning representations for utterances, including received user utterances and sample utterances of an intent/entity model. These meaning representations generally have a shape that captures the syntactic structure of an utterance, and include one or more subtree vectors that represent the semantic meanings of portions of the utterance. The meaning representation of the utterance can then be searched against a search space populated with the meaning representations of the sample utterances of the intent/entity model, and one or more matches may be identified. As the chat agent of the agent automation framework exchanges utterances with one or more users, a chat log or other corpus of utterances may be populated. The agent automation framework may then analyze the chat log to identify new words or new meanings for known words, and generate word vectors for these new words and/or meanings. The new word vectors can be used to better analyze user utterances and can also be used in agent utterances responding to user utterances. Accordingly, as time passes and utterances are exchanged with the user, the chat agent may learn new words and/or new meanings for known words, thus customizing the chat agent's vocabulary to the chat agent's specific application and users.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 18 (e.g., the Internet), and a cloud-based platform 20. In some implementations, the cloud-based platform 20 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14 may be computing systems and/or other types of computing devices generally referred to as Internet of Things (IoT) devices that access cloud computing services, for example, via a web browser application or via an edge device 16 that may act as a gateway between the client devices 14 and the platform 20. FIG. 1 also illustrates that the client network 12 includes an administration or managerial device, agent, or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14 via the client network 12 and network 18. The network hosting the platform 20 provides additional computing resources to the client devices 14 and/or the client network 12. For example, by utilizing the network hosting the platform 20, users of the client devices 14 are able to build and execute applications for various enterprise, IT, and/or other organization-related functions. In one embodiment, the network hosting the platform 20 is implemented on the one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server 24 can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary Apache installation), an application server (e.g., a unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 24 and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
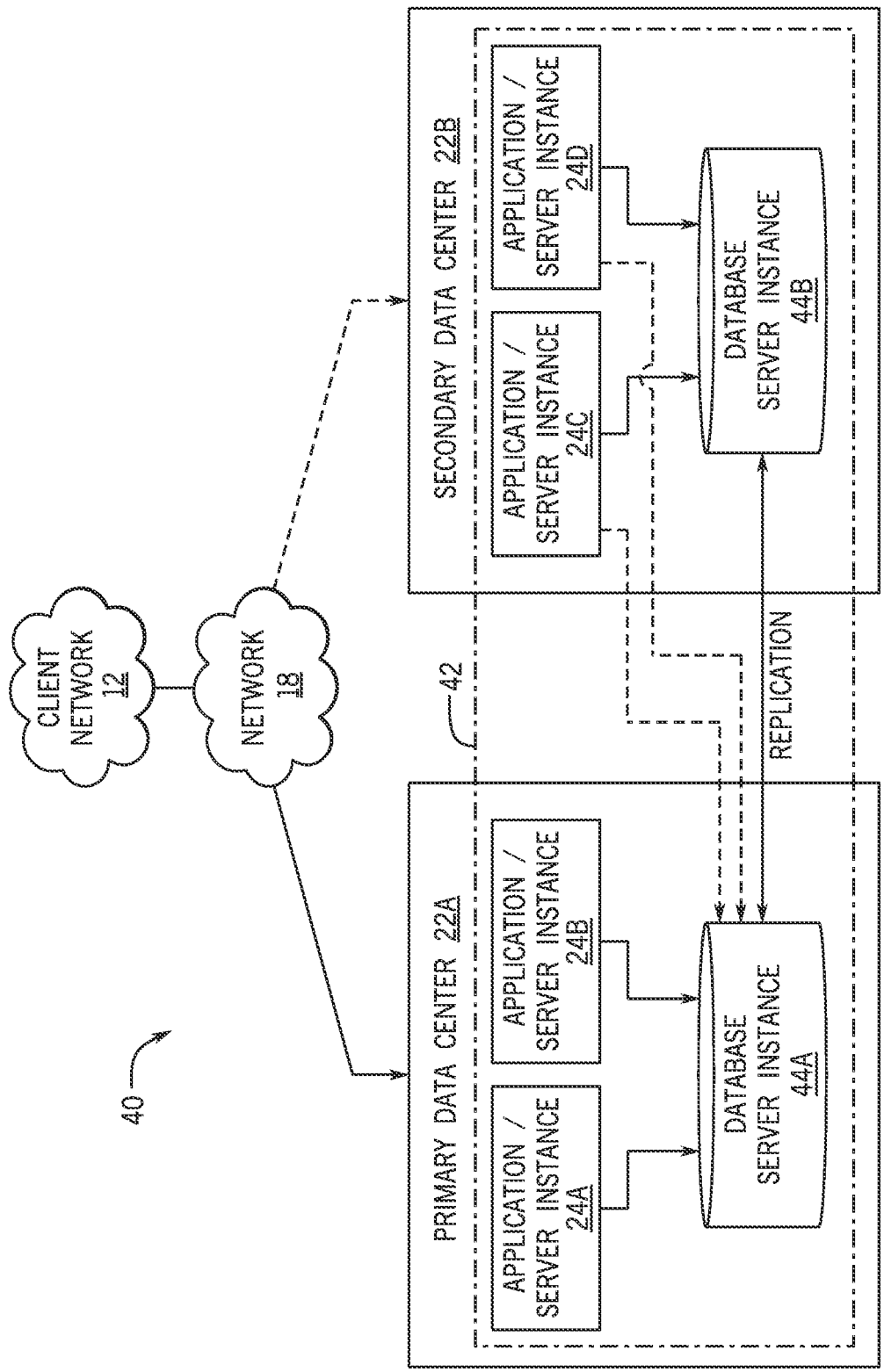
FIG. 2 is a block diagram of an embodiment of a multi-instance cloud architecture in which embodiments of the present techniques may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a client instance 42) is associated with (e.g., supported and enabled by) dedicated virtual servers (e.g., virtual servers 26A, 26B, 26C, and 26D) and dedicated database servers (e.g., virtual database servers 44A and 44B). Stated another way, the virtual servers 24A-24D and virtual database servers 44A and 44B are not shared with other client instances and are specific to the respective client instance 42. In the depicted example, to facilitate availability of the client instance 42, the virtual servers 24A-24D and virtual database servers 44A and 44B are allocated to two different data centers 22A and 22B so that one of the data centers 22 acts as a backup data center. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A, 24B, 24C, 24D and virtual database servers 44A, 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 include suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

It should be appreciated that the cloud-based platform 20 discussed above provides an example an architecture that may utilize NLU technologies. In particular, the cloud-based platform 20 may include or store a large corpus of source data that can be mined, to facilitate the generation of a number of outputs, including an intent/entity model. For example, the cloud-based platform 20 may include ticketing source data having requests for changes or repairs to particular systems, dialog between the requester and a service technician or an administrator attempting to address an issue, a description of how the ticket was eventually resolved, and so forth. Then, the generated intent/entity model can serve as a basis for classifying intents in future requests, and can be used to generate and improve a conversational model to support a virtual agent that can automatically address future issues within the cloud-based platform 20 based on natural language requests from users. As such, in certain embodiments described herein, the disclosed agent automation framework is incorporated into the cloud-based platform 20, while in other embodiments, the agent automation framework may be hosted and executed (separately from the cloud-based platform 20) by a suitable system that is communicatively coupled to the cloud-based platform 20 to process utterances, as discussed below.

Figure 4A:
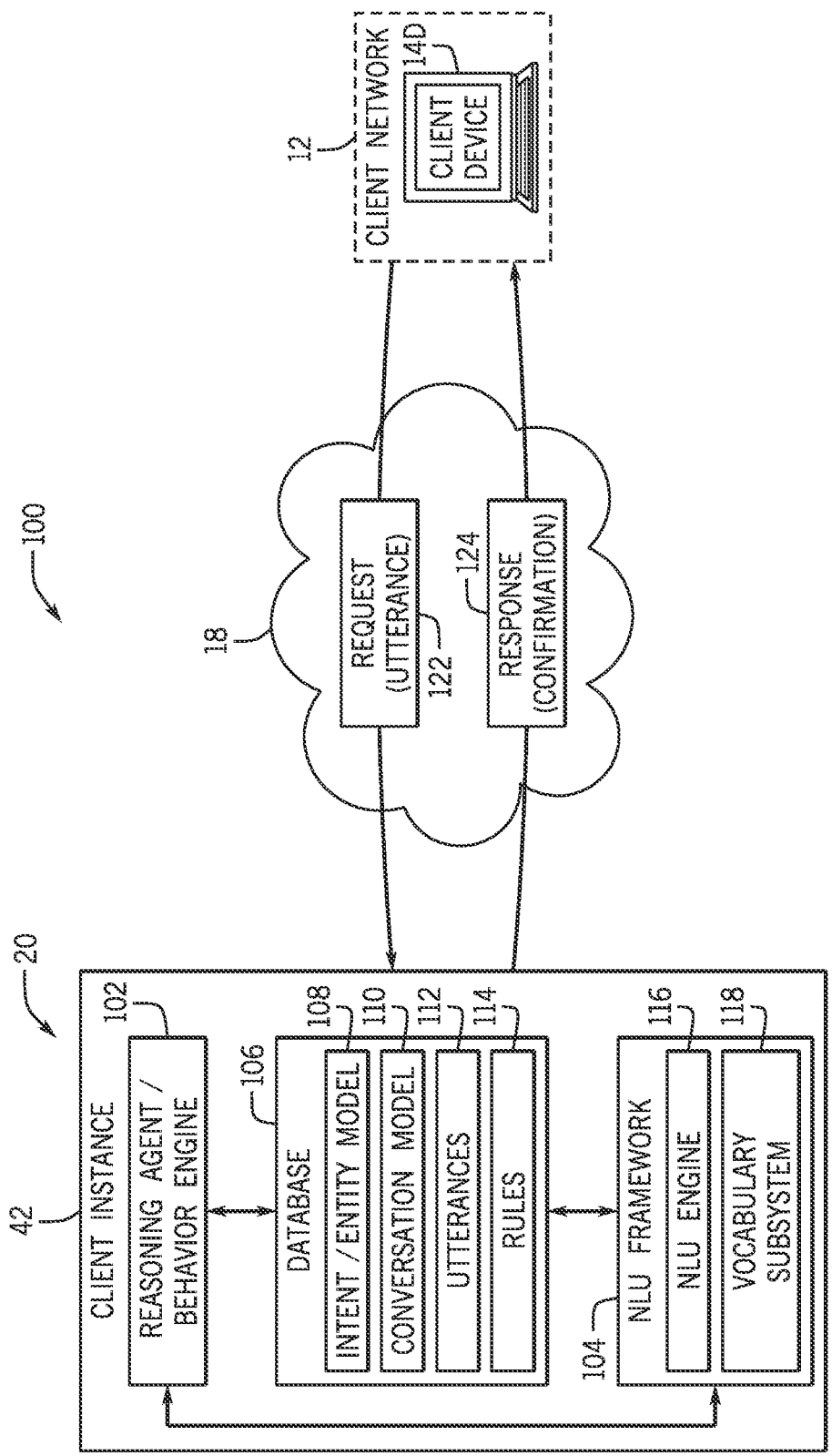
FIG. 4A is a schematic diagram illustrating an embodiment of an agent automation framework including a NLU framework that is part of a client instance hosted by the cloud computing system, in accordance with aspects of the present techniques.

With the foregoing in mind, FIG. 4A illustrates an agent automation framework 100 (also referred to herein as an agent automation system 100) associated with a client instance 42, in accordance with embodiments of the present technique. More specifically, FIG. 4A illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. The cloud provider infrastructure is generally configured to support a plurality of end-user devices, such as client device 14D, concurrently, wherein each end-user device is in communication with the single client instance 42. Also, the cloud provider infrastructure may be configured to support any number of client instances, such as client instance 42, concurrently, with each of the instances in communication with one or more end-user devices. As mentioned above, an end-user may also interface with client instance 42 using an application that is executed within a web browser.

The embodiment of the agent automation framework 100 illustrated in FIG. 4A includes a reasoning agent/behavior engine (RA/BE) 102, a NLU framework 104, and a database 106, which are communicatively coupled within the client instance 42. The RA/BE 102 may host or include any suitable number of virtual agents or personas that interact with the user of the client device 14D via natural language user requests 122 (also referred to herein as user utterances 122) and agent responses 124 (also referred to herein as agent utterances 124). It may be noted that, in actual implementations, the agent automation framework 100 may include a number of other suitable components, including the meaning extraction subsystem, the meaning search subsystem, and so forth, in accordance with the present disclosure.

For the embodiment illustrated in FIG. 4A, the database 106 may be a database server instance (e.g., database server instance 44A or 44B, as discussed with respect to FIG. 2), or a collection of database server instances. The illustrated database 106 stores an intent/entity model 108, a conversation model 110, a corpus of utterances 112, and a collection of rules 114 in one or more tables (e.g., relational database tables) of the database 106. The intent/entity model 108 stores associations or relationships between particular intents and particular sample utterances. In certain embodiments, the intent/entity model 108 may be authored by a designer using a suitable authoring tool. However, it should be noted that such intent/entity models typically include a limited number of sample utterances provided by the designer. Additionally, designers may have limited linguistic knowledge and, furthermore, are constrained from reasonably providing a comprehensive list of all possible ways of specifying intents in a domain. It is also presently recognized that, since the meaning associated with various intents and entities is continuously evolving within different contexts (e.g., different language evolutions per domain, per cultural setting, per client, and so forth), authored intent/entity models generally are manually updated over time. As such, it is recognized that authored intent/entity models are limited by the time and ability of the designer, and as such, these human-generated intent/entity models can be limited in both scope and functionality.

With this in mind, in certain embodiments, the intent/entity model 108 may instead be generated from the corpus of utterances 112 using techniques described in the commonly assigned, co-pending U.S. patent application Ser. No. 16/179,681, entitled, "METHOD AND SYSTEM FOR AUTOMATED INTENT MINING, CLASSIFICATION AND DISPOSITION," which is incorporated by reference herein in its entirety for all purposes.

More specifically, the intent/entity model 108 may be generated based on the corpus of utterances 112 and the collection of rules 114 stored in one or more tables of the database 106. It may be appreciated that the corpus of utterances 112 may include source data collected with respect to a particular context, such as chat logs between users and a help desk technician within a particular enterprise, from a particular group of users, communications collected from a particular window of time, and so forth. As such, the corpus of utterances 112 enable the agent automation framework 100 to build an understanding of intents and entities that appropriately correspond with the terminology and diction that may be particular to certain contexts and/or technical fields, as discussed in greater detail below.

For the embodiment illustrated in FIG. 4A, the conversation model 110 stores associations between intents of the intent/entity model 108 and particular responses and/or actions, which generally define the behavior of the RA/BE 102. In certain embodiments, at least a portion of the associations within the conversation model are manually created or predefined by a designer of the RA/BE 102 based on how the designer wants the RA/BE 102 to respond to particular identified intents/entities in processed utterances. It should be noted that, in different embodiments, the database 106 may include other database tables storing other information related to intent classification, such as a tables storing information regarding compilation model template data (e.g., class compatibility rules, class-level scoring coefficients, tree-model comparison algorithms, tree substructure vectorization algorithms), meaning representations, and so forth, in accordance with the present disclosure.

For the illustrated embodiment, the NLU framework 104 includes a NLU engine 116 and a vocabulary subsystem 118. It may be appreciated that the NLU framework 104 may include any suitable number of other components. In certain embodiments, the NLU engine 116 is designed to perform a number of functions of the NLU framework 104, including generating word vectors (e.g., intent vectors, subject or entity vectors, subtree vectors) from word or phrases of utterances, as well as determining distances (e.g., Euclidean distances) between these vectors. For example, the NLU engine 116 is generally capable of producing a respective intent vector for each intent of an analyzed utterance. As such, a similarity measure or distance between two different utterances can be calculated using the respective intent vectors produced by the NLU engine 116 for the two intents, wherein the similarity measure provides an indication of similarity in meaning between the two intents.

The vocabulary subsystem 118 addresses out-of-vocabulary words and symbols that were not encountered by the NLU framework 104 during vocabulary training. For example, in certain embodiments, the vocabulary subsystem 118 can identify and replace synonyms and domain-specific meanings of words and acronyms within utterances analyzed by the agent automation framework 100 (e.g., based on the collection of rules 114), which can improve the performance of the NLU framework 104 to properly identify intents and entities within context-specific utterances. Additionally, to accommodate the tendency of natural language to adopt new usages for pre-existing words, in certain embodiments, the vocabulary subsystem 118 handles repurposing of words previously associated with other intents or entities based on a change in context. For example, the vocabulary subsystem 118 could handle a situation in which, in the context of utterances from a particular client instance and/or conversation channel, the word "bike" actually refers to a motorcycle rather than a bicycle.

Once the intent/entity model 108 and the conversation model 110 have been created, the agent automation framework 100 is designed to receive a user utterance 122 (in the form of a natural language request) and to appropriately take action to address request. For example, for the embodiment illustrated in FIG. 4A, the RA/BE 102 is a virtual agent that receives, via the network 18, the utterance 122 (e.g., a natural language request in a chat communication) submitted by the client device 14D disposed on the client network 12. The RA/BE 102 provides the utterance 122 to the NLU framework 104, and the NLU engine 116, along with the various subsystems of the NLU framework discussed below, processes the utterance 122 based on the intent/entity model 108 to derive intents/entities within the utterance. Based on the intents/entities derived by the NLU engine 116, as well as the associations within the conversation model 110, the RA/BE 102 performs one or more particular predefined actions. For the illustrated embodiment, the RA/BE 102 also provides a response 124 (e.g., a virtual agent utterance or confirmation) to the client device 14D via the network 18, for example, indicating actions performed by the RA/BE 102 in response to the received user utterance 122. Additionally, in certain embodiments, the utterance 122 may be added to the utterances 112 stored in the database 106 for continued learning within the NLU framework 104, as discussed below.

It may be appreciated that, in other embodiments, one or more components of the agent automation framework 100 and/or the NLU framework 104 may be otherwise arranged, situated, or hosted for improved performance. For example, in certain embodiments, one or more portions of the NLU framework 104 may be hosted by an instance (e.g., a shared instance, an enterprise instance) that is separate from, and communicatively coupled to, the client instance 42. It is presently recognized that such embodiments can advantageously reduce the size of the client instance 42, improving the efficiency of the cloud-based platform 20. In particular, in certain embodiments, one or more components of the semantic mining framework 130 discussed below may be hosted by a separate instance (e.g., an enterprise instance) that is communicatively coupled to the client instance 42, as well as other client instances, to enable semantic intent mining and generation of the intent/entity model 108.

Figure 4B:
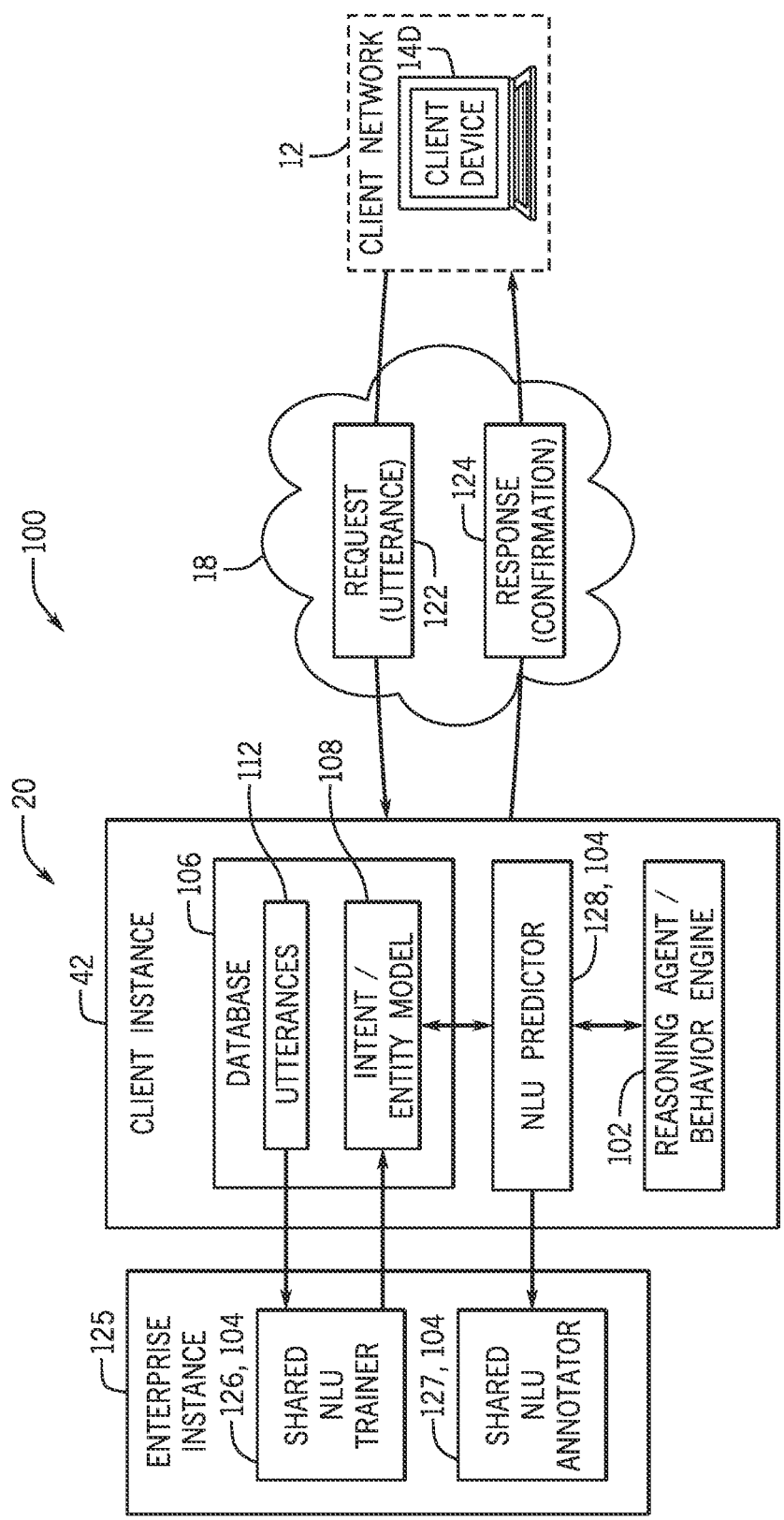
FIG. 4B is a schematic diagram illustrating an alternative embodiment of the agent automation framework in which portions of the NLU framework are part of an enterprise instance hosted by the cloud computing system, in accordance with aspects of the present techniques.

With the foregoing in mind, FIG. 4B illustrates an alternative embodiment of the agent automation framework 100 in which portions of the NLU framework 104 are instead executed by a separate, shared instance (e.g., enterprise instance 125) that is hosted by the cloud computing system 10. The illustrated enterprise instance 125 is communicatively coupled to exchange data related to intent/entity mining and classification with any suitable number of client instances via a suitable protocol (e.g., via suitable Representational State Transfer (REST) requests/responses). As such, for the design illustrated in FIG. 4B, by hosting a portion of the NLU framework as a shared resource accessible to multiple client instances 42, the size of the client instance 42 can be substantially reduced (e.g., compared to the embodiment of the agent automation framework 100 illustrated in FIG. 4A) and the overall efficiency of the agent automation framework 100 can be improved.

In particular, the NLU framework 104 illustrated in FIG. 4B is divided into three distinct components that perform different aspects of semantic mining and intent classification within the NLU framework 104. These components include: a shared NLU trainer 126 hosted by the enterprise instance 125, a shared NLU annotator 127 hosted by the enterprise instance 125, and a NLU predictor 128 hosted by the client instance 42. It may be appreciated that the organizations illustrated in FIGS. 4A and 4B are merely examples, and in other embodiments, other organizations of the NLU framework 104 and/or the agent automation framework 100 may be used, in accordance with the present disclosure.

For the embodiment of the agent automation framework 100 illustrated in FIG. 4B, the shared NLU trainer 126 is designed to receive the corpus of utterances 112 from the client instance 42, and to perform semantic mining (e.g., including semantic parsing, grammar engineering, and so forth) to facilitate generation of the intent/entity model 108. Once the intent/entity model 108 has been generated, when the RA/BE 102 receives the user utterance 122 provided by the client device 14D, the NLU predictor 128 passes the utterance 122 and the intent/entity model 108 to the shared NLU annotator 127 for parsing and annotation of the utterance 122. The shared NLU annotator 127 performs semantic parsing, grammar engineering, and so forth, of the utterance 122 based on the intent/entity model 108 and returns annotated utterance trees of the utterance 122 to the NLU predictor 128 of client instance 42. The NLU predictor 128 then uses these annotated structures of the utterance 122, discussed below in greater detail, to identify matching intents from the intent/entity model 108, such that the RA/BE 102 can perform one or more actions based on the identified intents. It may be appreciated that the shared NLU annotator 127 may correspond to the meaning extraction subsystem 150, and the NLU predictor may correspond to the meaning search subsystem 152, of the NLU framework 104, as discussed below.

Figure 5:
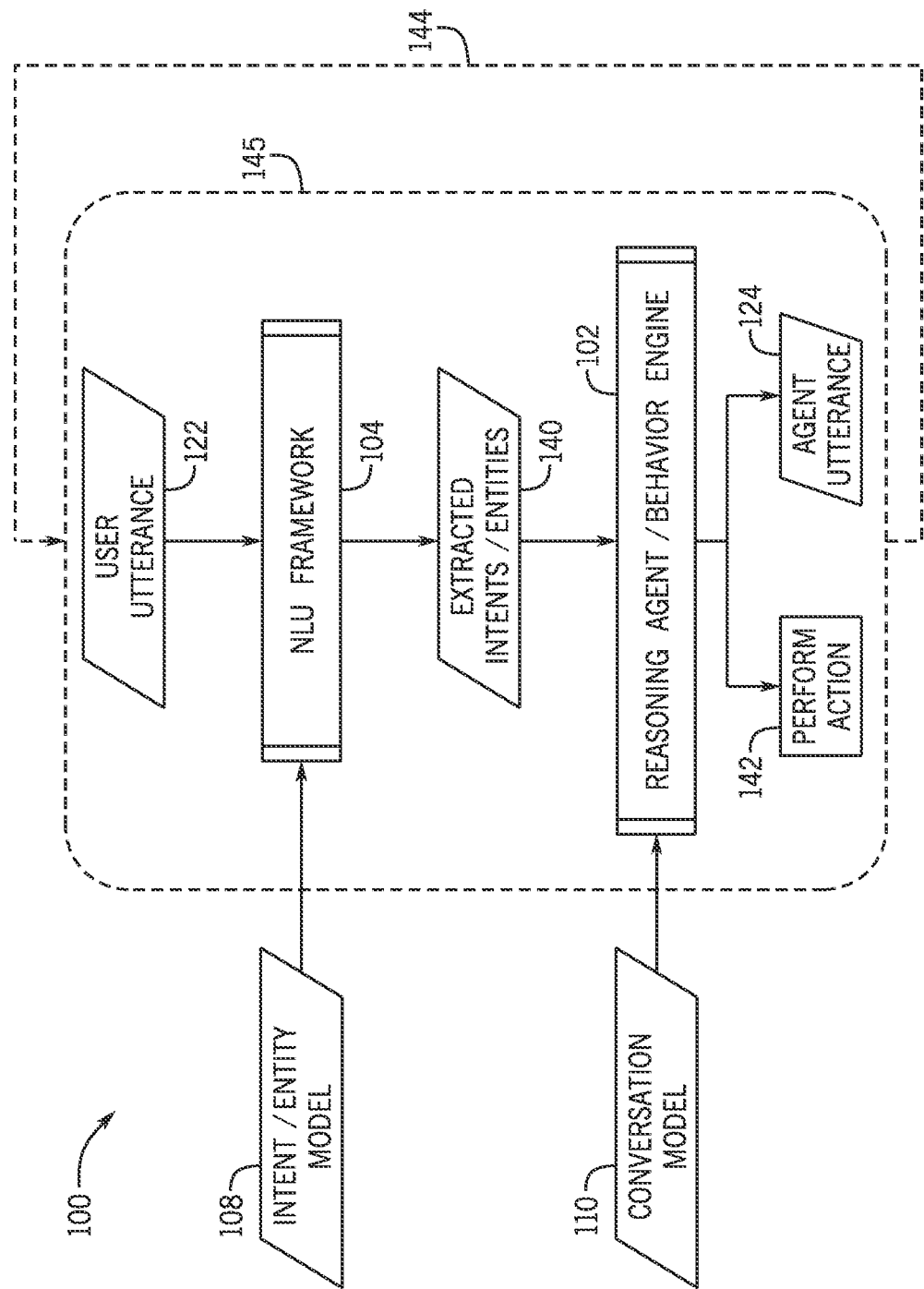
FIG. 5 is a flow diagram illustrating an embodiment of a process by which an agent automation framework, including an NLU framework and a Reasoning Agent/Behavior Engine (RA/BE) framework, extracts intent/entities from and responds to a user utterance, in accordance with aspects of the present techniques.

FIG. 5 is a flow diagram depicting the roles of the reasoning agent/behavior engine (RA/BE) 102 and NLU framework 104 within an embodiment of the agent automation framework 100. For the illustrated embodiment, the NLU framework 104 processes a received user utterance 122 to extract intents/entities 140 based on the intent/entity model 108. The extracted intents/entities 140 may be implemented as a collection of symbols that represent intents and entities of the user utterance 122 in a form that is consumable by the RA/BE 102. As such, these extracted intents/entities 140 are provided to the RA/BE 102, which processes the received intents/entities 140 based on the conversation model 110 to determine suitable actions 142 (e.g., changing a password, creating a record, purchasing an item, closing an account) and/or virtual agent utterances 124 in response to the received user utterance 122. As indicated by the arrow 144, the process 145 can continuously repeat as the agent automation framework 100 receives and addresses additional user utterances 122 from the same user and/or other users in a conversational format.

As illustrated in FIG. 5, it may be appreciated that, in certain situations, no further action or communications may occur once the suitable actions 142 have been performed. Additionally, it should be noted that, while the user utterance 122 and the agent utterance 124 are discussed herein as being conveyed using a written conversational medium or channel (e.g., chat, email, ticketing system, text messages, forum posts), in other embodiments, voice-to-text and/or text-to-voice modules or plugins could be included to translate spoken user utterance 122 into text and/or translate text-based agent utterance 124 into speech to enable a voice interactive system, in accordance with the present disclosure. Furthermore, in certain embodiments, both the user utterance 122 and the virtual agent utterance 124 may be stored in the database 106 (e.g., in the corpus of utterances 112) to enable continued learning of new structure and vocabulary within the agent automation framework 100.

Figure 6:
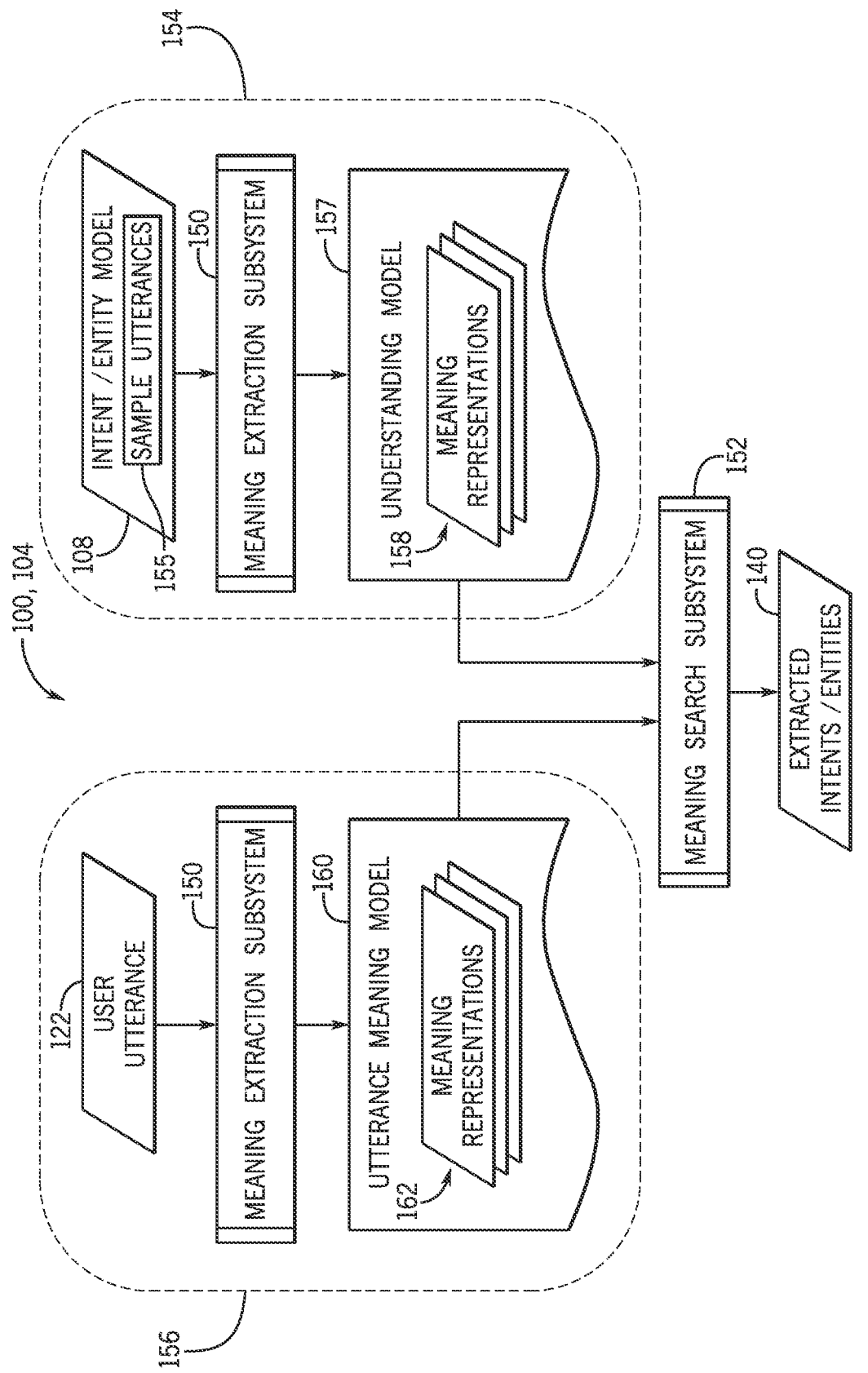
FIG. 6 is a block diagram illustrating an embodiment of the NLU framework including a meaning extraction subsystem and a meaning search subsystem, wherein the meaning extraction subsystem generates meaning representations from a received user utterance to yield an utterance meaning model and generates meaning representations from sample utterances of an intent/entity model to yield understanding model, and wherein the meaning search subsystem compares meaning representations of the utterance meaning model to meaning representations of the understanding model to extract intents and entities from the received user utterance, in accordance with aspects of the present techniques.

As mentioned, the NLU framework 104 includes two primary subsystems that cooperate to convert the hard problem of NLU into a manageable search problem—namely: a meaning extraction subsystem and a meaning search subsystem. For example, FIG. 6 is a block diagram illustrating roles of the meaning extraction subsystem 150 and the meaning search subsystem 152 of the NLU framework 104 within an embodiment of the agent automation framework 100. For the illustrated embodiment, the right-hand portion 154 of FIG. 6 illustrates the meaning extraction subsystem 150 of the NLU framework 104 receiving the intent/entity model 108, which includes sample utterances 155 for each of the various intents/entities of the model. The meaning extraction subsystem 150 generates an understanding model 157 that includes meaning representations 158 of the sample utterances 155 of the intent/entity model 108. In other words, the understanding model 157 is a translated or augmented version of the intent/entity model 108 that includes meaning representations 158 to enable meaning searching (e.g., comparison and matching) by the meaning search subsystem 152, as discussed below. As such, it may be appreciated that the right-hand portion 154 of FIG. 6 is generally performed in advance of receiving the user utterance 122, such as on a routine, scheduled basis or in response to updates to the intent/entity model 108.

For the embodiment illustrated in FIG. 6, the left-hand portion 156 illustrates the meaning extraction subsystem 150 also receiving and processing the user utterance 122 to generate an utterance meaning model 160 having at least one meaning representation 162. As discussed in greater detail below, these meaning representations 158 and 162 are data structures having a form that captures the grammatical, syntactic structure of an utterance, wherein subtrees of the data structures include subtree vectors that encode the semantic meanings of portions of the utterance. As such, for a given utterance, a corresponding meaning representation captures both syntactic and semantic meaning in a common meaning representation format that enables searching, comparison, and matching by the meaning search subsystem 152, as discussed in greater detail below. Accordingly, the meaning representations 162 of the utterance meaning model 160 can be generally thought of like a search key, while the meaning representations of the understanding model 157 define a search space in which the search key can be sought. Accordingly, the meaning search subsystem 152 searches the meaning representations 158 of the understanding model 157 to locate one or more intents/entities that match the meaning representation 162 of the utterance meaning model 160 as discussed below, thereby generating the extracted intents/entities 140.

Figure 7:
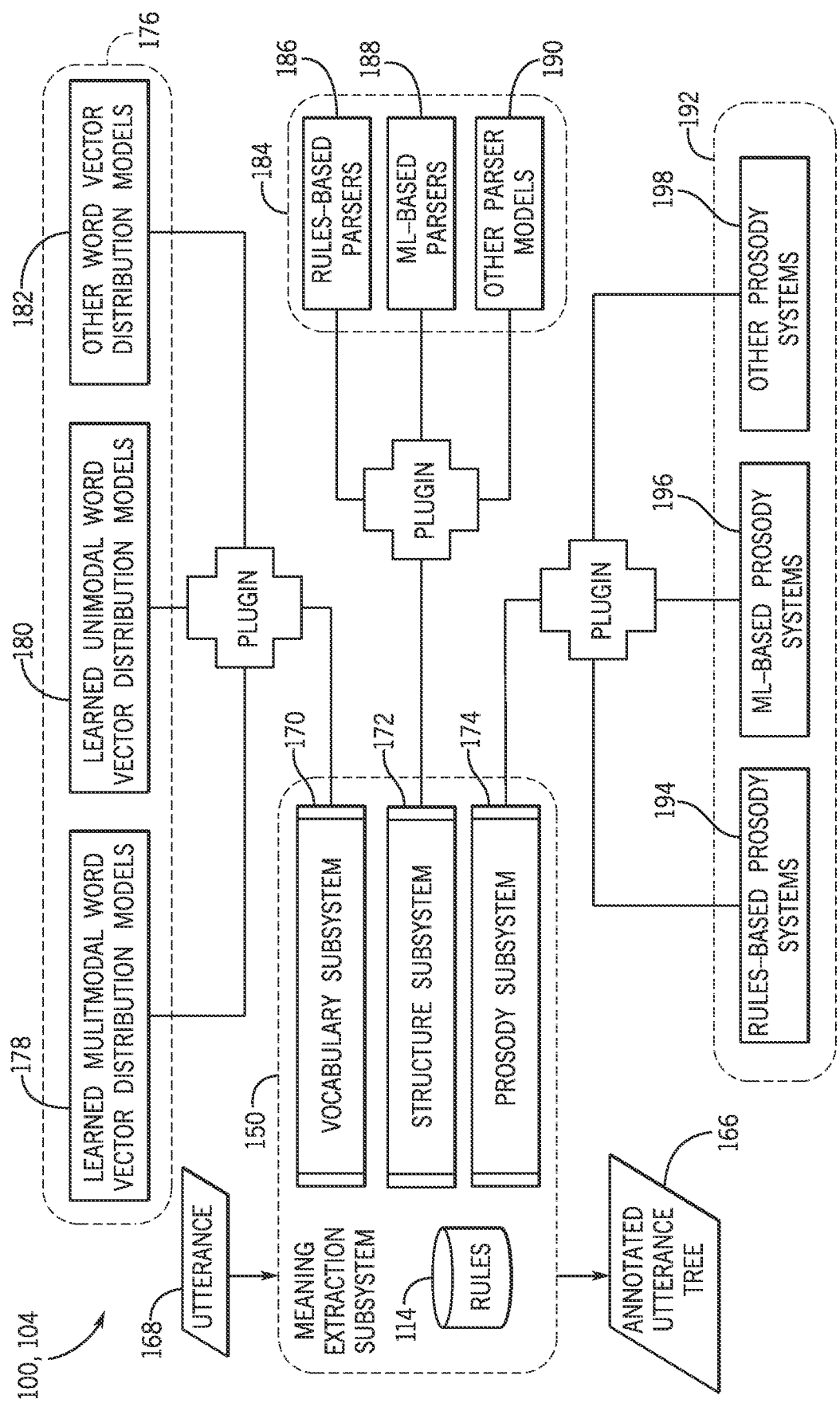
FIG. 7 is a block diagram illustrating an embodiment of the meaning extraction subsystem using a combination of rules-based methods and machine-learning (ML)-based methods within a vocabulary subsystem, a structure subsystem, and a prosody subsystem, to generate an annotated utterance tree for an utterance, in accordance with aspects of the present techniques.

The meaning extraction subsystem of FIG. 6 itself includes a number of subsystems that cooperate to generate the meaning representations 158 and 162. For example, FIG. 7 is a block diagram illustrating an embodiment of the meaning extraction subsystem 150 of the NLU framework 104 of the agent automation framework 100. The illustrated embodiment of the meaning extraction subsystem 150 uses a rules-based methods interleaved with ML-based methods to generate an annotated utterance tree 166 for an utterance 168, which may be either a user utterance 122 or one of the sample utterances 155 of the intent/entity model 108, as discussed above with respect to FIG. 6. More specifically, FIG. 7 illustrates how embodiments of the meaning extraction subsystem 150 can include a number of best-of-breed models, including combinations of rule-based and ML-based (e.g., statistical) models and programs, that can be plugged into the overall NLU framework 104. For example, because of the pluggable design of the illustrated meaning extraction subsystem 150, the vocabulary subsystem 170 can include any suitable word vector distribution model that defines word vectors for various words or phrases. That is, since it is recognized that different word distribution models can excel over others in a given conversational channel, language, context, and so forth, the disclosed pluggable design enables the meaning extraction subsystem 150 to be customized to particular environments and applications. For the embodiment illustrated in FIG. 7, the meaning extraction subsystem 150 includes three plugin-supported subsystems, namely a vocabulary subsystem 170, a structure subsystem 172, and a prosody subsystem 174, and the various outputs of these subsystems are combined according to the stored rules 114 to generate the annotated utterance tree 166 from the utterance 168.

For the embodiment of the meaning extraction subsystem 150 illustrated in FIG. 7, the vocabulary subsystem 170 generally handles the vocabulary of the meaning extraction subsystem 150. As such, the illustrated meaning extraction subsystem 150 includes a number of vocabulary plug-ins 176 that enable analysis and extraction of the vocabulary of utterances. For the illustrated embodiment, the vocabulary plug-ins 176 include a learned multimodal word vector distribution model 178, a learned unimodal word vector distribution model 180, and any other suitable word vector distribution models 182. In this context, "unimodal" refers to word vector distribution models having a single respective vector for each word, while "multimodal" refers to word vector distribution models supporting multiple vectors for particular words (e.g., homonyms, polysemes) that can have different meanings in different contexts (e.g., a "bank" may refer to a place to store money, money itself, a maneuver of an aircraft, or a location near a river). The models 178, 180, and 182 provide pluggable collections of word vectors that can be selected based on suitable parameters, such as language, conversation style, conversational channel, and so forth.

For example, the learned multimodal distribution model 178 and the learned unimodal distribution model 180 can provide word distributions (e.g., defined vector spaces of word vectors) that are generated using unsupervised learning or other general clustering algorithms. That is, appreciating that words commonly used in close proximity within utterances often have related meanings, the learned multimodal distribution model 178 and learned unimodal distribution model 180 can be generated by performing statistical analysis of utterances (e.g., from the corpus of utterances 112), and then defining vectors for words based on how the word is commonly used with respect to other words within these utterances. As such, these vocabulary plugins 176 enable the vocabulary subsystem 170 to recognize and address synonyms, misspelled words, encoded symbols (e.g., web addresses, network paths, emoticons, and emojis), out-of-vocabulary terms, and so forth, when processing the user utterance 122 and sample utterances 155. In certain embodiments, the vocabulary subsystem 170 can combine or select from word vectors output by the various vocabulary plug-ins 176 based on the stored rules 114 to generate word vectors for nodes of the annotated utterance tree 166, as discussed below. Moreover, the word vector distribution models 178, 180, and/or 182 can be continually updated based on unsupervised learning performed on received user utterances 122.

For the embodiment illustrated in FIG. 7, the structure subsystem 172 of the meaning extraction subsystem 150 analyzes a linguistic shape of the utterance 168 using a combination of rule-based and ML-based structure parsing plugins 184. In other words, the illustrated structure plug-ins 184 enable analysis and extraction of the syntactic and grammatical structure of the utterances 122 and 155. For the illustrated embodiment, the structure plug-ins 184 include rule-based parsers 186, ML-based parsers 188 (e.g., DNN-based parsers, RNN-based parsers, and so forth), and other suitable parser models 190. For example, one or more of these structure plug-ins 184 enables class annotations or tagging (e.g., as a verb, a subject or entity, a direct object, a modifier, and so forth) for each word or phrase of the utterance. In certain embodiments, the structure subsystem 172 can combine or select from parse structures output by the various structure plug-ins 184 based on one or more rules 114 stored in the database 106, which are used to define the structure or shape of the annotated utterance trees 166, as discussed below.

For the embodiment illustrated in FIG. 7, the prosody subsystem 174 of the meaning extraction subsystem 150 analyzes the prosody of the utterance 168 using a combination of rule-based and ML-based prosody plugins 196. The illustrated prosody plug-ins 192 include rule-based prosody systems 194, ML-based prosody systems 196, and other suitable prosody systems 198. Using these plugins, the prosody subsystem 174 analyzes the utterance 168 for prosody cues, such as rhythm (e.g., speech rhythm, segmentations indicated by punctuation or pauses), emphasis (e.g., capitalization, bolding, underlining, asterisks), focus or attention (e.g., repetition of particular terms or styles), and so forth, which can be used to determine, for example, boundaries between intents, degrees of urgency or relative importance with respect to different intents, and so forth. As such, in certain embodiments, the prosody subsystem 174 can combine or select from prosody parsed structures output by the various prosody plug-ins 192 based on the rules 114 stored in the database 106 to generate the annotated utterance tree 166, as discussed below.

As such, for the embodiment of the meaning extraction subsystem 150 illustrated in FIG. 7, the vocabulary subsystem 170, the structure subsystem 172, and the prosody subsystem 174 cooperate to generate the annotated utterance tree 166 from the utterance 168 based on one or more rules 114. It may be appreciated that, in certain embodiments, a portion of the output of one subsystem (e.g., the prosody subsystem 174) may be provided as input to another subsystem (e.g., the structure subsystem 172) when generating the annotated utterance tree 166 from the utterance 168. The resulting annotated utterance tree 166 data structure generated by the meaning extraction subsystem 150 includes a number of nodes, each associated with a respective word vector provided by the vocabulary subsystem 170. Furthermore, these nodes are arranged and coupled together to form a tree structure based on the output of the structure subsystem 172 and the prosody subsystem 174, according to the stored rules 114.

Figure 8:
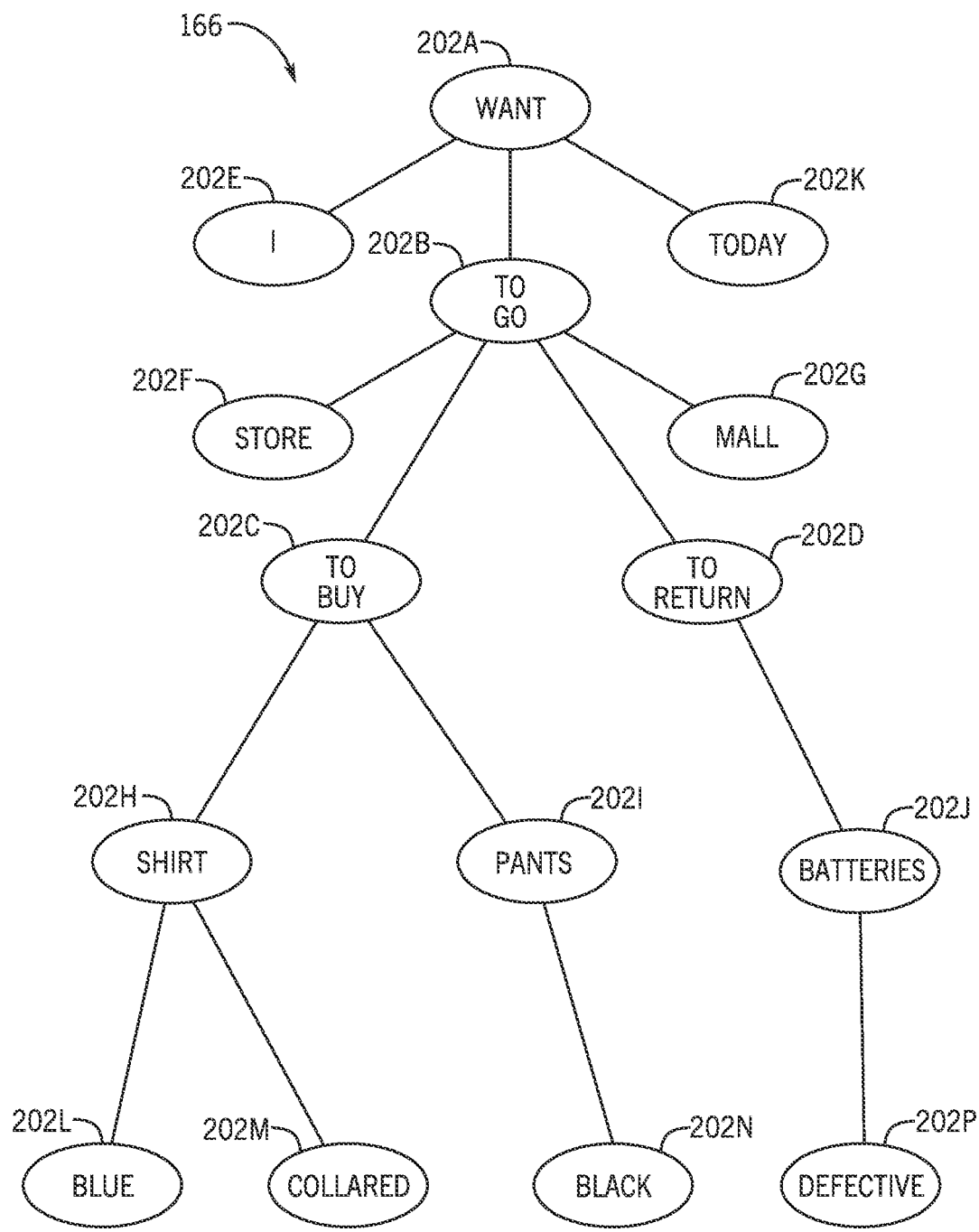
FIG. 8 is a diagram illustrating an embodiment of an annotated utterance tree, in accordance with aspects of the present techniques.

For example, FIG. 8 is a diagram illustrating an example of an annotated utterance tree 166 generated for an utterance 168, in accordance with an embodiment of the present approach. As mentioned, the annotated utterance tree 166 is a data structure that is generated by the meaning extraction subsystem 150 based on the utterance 168. For the example illustrated in FIG. 8, the annotated utterance tree 166 is based on an example utterance, "I want to go to the store by the mall today to buy a blue, collared shirt and black pants and also to return some defective batteries." The illustrated annotated utterance tree 166 includes a set of nodes 202 (e.g., nodes 202A, 202B, 202C, 202D, 202E, 202F, 202G, 202H, 202I, 202J, 202K, 202L, 202M, 202N, and 202P) arranged in a tree structure, each node representing a particular word or phrase of the utterance 168. It may be noted that each of the nodes 202 may also be described as representing a particular subtree of the annotated utterance tree 166, wherein a subtree can include one or more nodes 202.

As mentioned, the form or shape of the annotated utterance tree 166 illustrated in FIG. 8 is determined by the prosody subsystem 174 and the structure subsystem 172 and represents the syntactic, grammatical meaning of the example utterance. More specifically, the prosody subsystem 174 segments the utterance, while the structure subsystem 172 constructs the annotated utterance tree 166 from these segments. Each of the nodes 202 store or reference a respective word vector that is determined by the vocabulary subsystem 170 to indicate the semantic meaning of the particular word or phase of the utterance. As mentioned, each word vector is an ordered n-dimensional list (e.g., a 300 dimensional list) of floating point values (e.g., a 1×N or an N×1 matrix) that provides a mathematical representation of the semantic meaning of a portion of an utterance.

Moreover, each of the nodes 202 is annotated by the structure subsystem 172 with additional information about the word or phrase represented by the node. For example, in FIG. 8, each of the nodes 202 has a respective shading or cross-hatching that is indicative of the class annotation of the node. In particular, for the example annotated utterance tree illustrated in FIG. 8, certain subtrees or nodes (e.g., nodes 202A, 202B, 202C, and 202D) are annotated to be verb nodes, and certain subtrees or nodes (e.g., nodes 202E, 202F, 202G, 202H, 202I, and 202J) are annotated to be subject or object nodes, and certain subtrees or nodes (e.g., nodes 202K, 202L, 202M, 202N, and 202P) are annotated to be modifier nodes (e.g., subject modifier nodes, object modifier nodes, verb modifier nodes) by the structure subsystem 172. As discussed below, these class annotations are used by the meaning search subsystem 152 when comparing meaning representations that are generated from annotated utterance trees, like the example annotated utterance tree 166 illustrated in FIG. 8. As such, it may be appreciated that the annotated utterance tree 166, from which the meaning representations are generated, serves as a basis (e.g., an initial basis) for intent/entity extraction.

Figure 9:
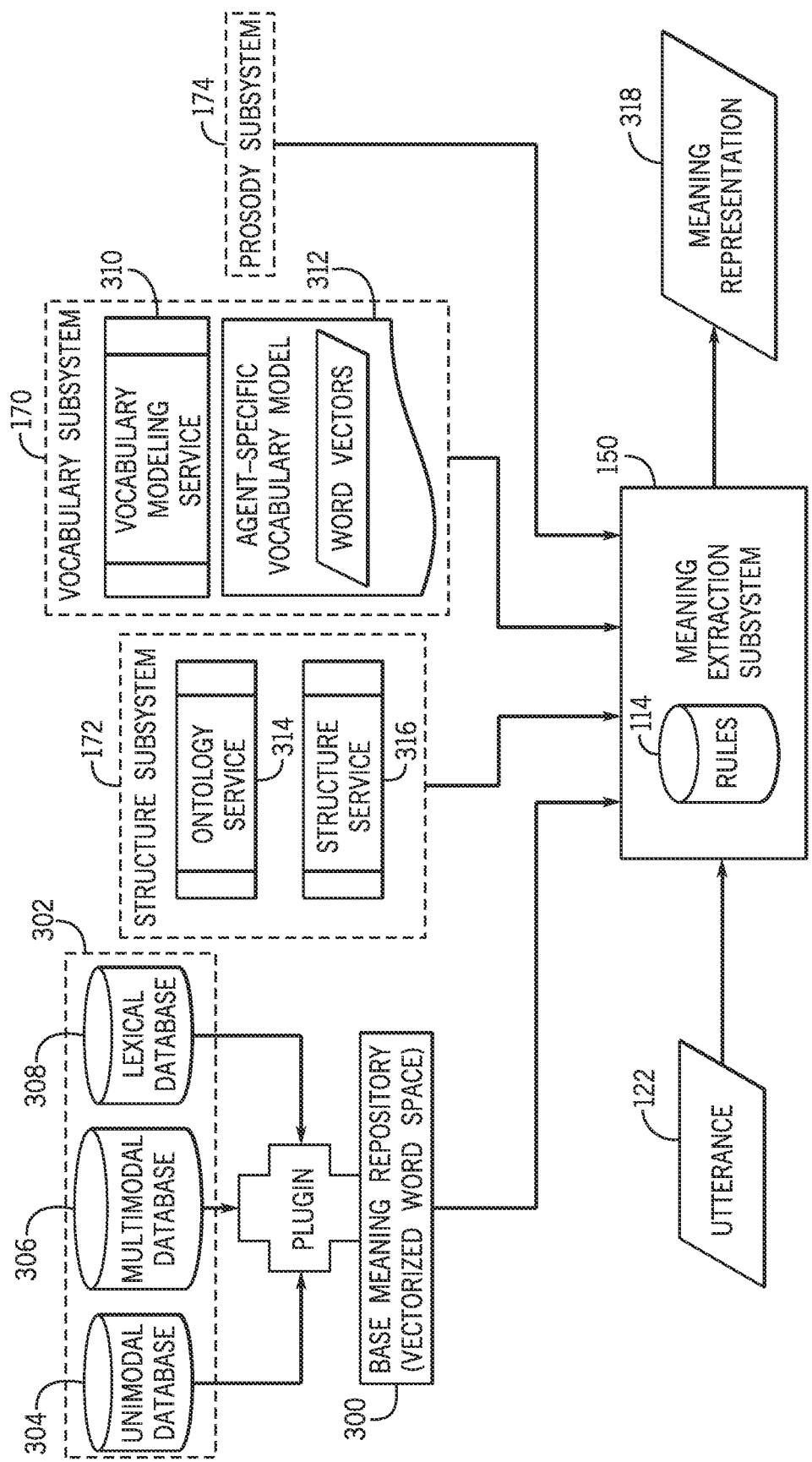
FIG. 9 is a block diagram illustrating how the vocabulary subsystem of FIG. 7 operates within the NLU framework, in accordance with aspects of the present techniques.

FIG. 9 is a block diagram illustrating how the vocabulary subsystem of FIG. 7 operates within the NLU framework 104. As shown, the rule based meaning and extraction system 150 has access to a base meaning repository 300. The base meaning repository 300 may be a vectorized word space. That is, the base meaning repository 300 may include a collection of word vectors for known vocabulary words. As shown, the base meaning repository 300 may have access to a number of word distribution databases 302. In the illustrated embodiment, the word distribution databases 302 include a unimodal database 304, a multimodal database 306, and a lexical database 308. As described above with regard to FIG. 7, unimodal refers to word vector distributions having a single vector for each word. Accordingly, the unimodal database 304 may include a single word vector for each word listed in the database 304. Correspondingly, multimodal refers to having word vector distributions supporting multiple vectors for particular words (e.g., homonyms, polysemes) that can have different meanings in different contexts (e.g., a "bank" may refer to a place to store money, money itself, a maneuver of an aircraft, or a location near a river). As such, the multimodal database 306 may include multiple word vectors for each word listed in the database 306 based on the different possible meanings for the word. The lexical database 308 may be used to for disambiguation purposes to help select the correct word vector for a given word from the multimodal database 306. In some embodiments, this determination may be made based on context with help from the structure subsystem 172. In some embodiments, as is discussed in more detail below, the lexical database 308 may also be used to generate word vectors for new words that were previously unknown, or for new meanings for known words. It should be understood, however, that the word distribution databases 302 shown in FIG. 9 are merely examples and that embodiments are envisaged that utilize additional databases, fewer databases, or different combinations of databases.

As shown, data from the word distribution databases 302 may be retrieved or plugged into the base meaning repository 300 to provide a repository of known vocabulary words and their meanings to the meaning extraction subsystem 150. As previously described, the meaning extraction subsystem 150 may parse provided utterances and output one or more meaning representations 318. Occasionally, the meaning extraction subsystem 150 may come across a new word that is not in the base meaning repository 300, or use of a word in the base meaning repository 300 that does not comport with any of the meanings of the word stored in the base meaning repository 300. In such instances, the meaning extraction subsystem 150 may alert a vocabulary modeling service 310. In some embodiments, the meaning extraction subsystem 150 may provide the vocabulary modeling service 310 with both the new word and/or meaning, as well as the context in which the new word and/or meaning was used. The vocabulary modeling service 310 generates and/or maintains an agent-specific vocabulary model 312. For example, the vocabulary modeling service 310 may store meanings for new vocabulary words and/or alternate meanings for known vocabulary words. For example, a company may have in its office a conference room called "Everest". Accordingly, the vocabulary modeling service 310 may store the meaning of the word "Everest" as being a mountain and/or a conference room. Further, the vocabulary modeling service 310 may notice certain patterns for when different meanings of a word are intended and update meaning/derivation rules and/or synonym entries accordingly. For example, the character sequence "http" may indicate that the character string is a URL. Accordingly, as new words, or new meanings for existing words, are used, a patterns for what meaning is intended are discovered, the vocabulary modeling service 310 may update the agent-specific vocabulary model 312 to incorporate these changes. In some embodiments, the vocabulary modeling service 310 may update the base meaning repository 300 with new words and/or meanings. Accordingly, over time, as new words, or new meanings for existing words, are used, the agent-specific vocabulary model 312 may evolve such that the agent is more suited to its specific application.

As previously discussed, when the meaning extraction subsystem 150 notices a new word or a new meaning for an existing word, the meaning extraction subsystem 150 notifies the vocabulary modeling service 310 and provides the new word and/or meaning to the vocabulary modeling service 310, as well as the context in which the new word and/or meaning was used. In some embodiments, the structure subsystem 172 may be used analyze the context in which the new word and/or meaning were used. For example, as shown in FIG. 9, the structure subsystem 172 may include an ontology service 314 and a structure service 316. The ontology service 314 may access the lexical database 308, which may store metadata for words reflecting different possible forms of the word (e.g., noun, verb, adjective, etc.). The structure service 316 performs linguistic structure extraction (e.g., parsing the structure, tagging parts of speech, etc.) and may assist the ontology service 314 in disambiguation by analyzing the context of the new word and/or meaning. Accordingly, the ontology service 314 and the structure service 316 may work in concert, using data from the lexical database, to analyze the use of the word, the context of the word's use, and determine what meaning of the word was intended.

As previously described, the prosody subsystem 174 analyzes the prosody of the utterance using a combination of rule-based and ML-based prosody plugins. Specifically, the prosody subsystem 174 analyzes the utterance for prosody cues, such as rhythm (e.g., speech rhythm, segmentations indicated by punctuation or pauses), emphasis (e.g., capitalization, bolding, underlining, asterisks), focus or attention (e.g., repetition of particular terms or styles), and so forth, which can be used to determine, for example, boundaries between intents, degrees of urgency or relative importance with respect to different intents, and so forth. Accordingly, the prosody subsystem 174 can combine or select from prosody parsed structures output by the various prosody plug-ins to help generate the meaning representations 318.

Figure 10:
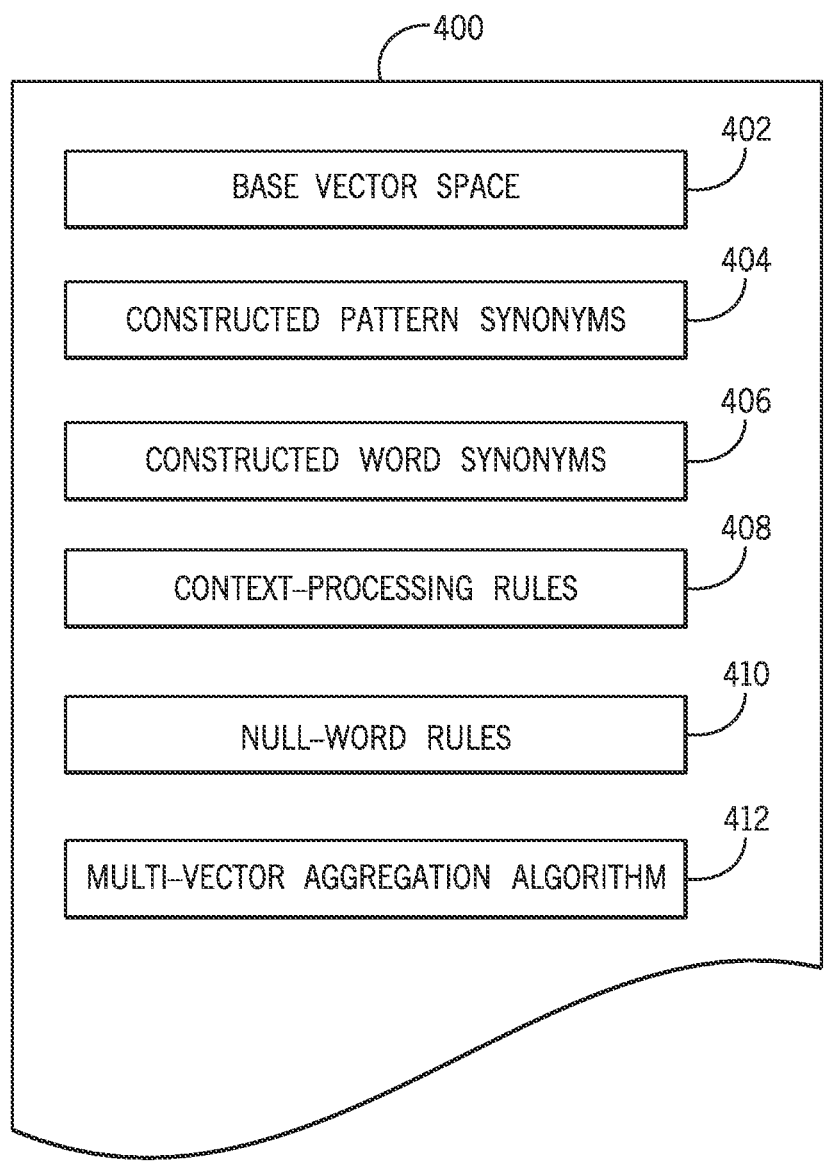
FIG. 10 is a diagram illustrating what may be included in a vocabulary model template, in accordance with aspects of the present techniques.

The agent specific vocabulary model may be developed using a collection of vocabulary model templates. FIG. 10 is a diagram illustrating what may be included in a vocabulary model template 400. As shown, the vocabulary model template 400 may include fields for base vector space 402, constructed pattern synonyms 404, constructed word synonyms 406, context processing rules 408, null word rules 410, and multi-vector algorithms 412.

The base vector space 402 may include data from the base meaning repository 300 and/or the databases 302. Accordingly, the data may include one or more word vectors (e.g., a vector for each respective meaning), as well as data corresponding to word usage and methods for vector learning and/or derivation. As previously described, the base vector space 402 may be derived from some available corpus of data (e.g., one or more websites, or some other collection of writing) and act as a basis for subsequent modifications to the meanings of the word.

The constructed pattern synonyms 404 include one or more phrases or collections of words that may act synonyms for the word in question or otherwise have the same or similar meanings as the word in question. Similarly, the constructed word synonyms 406 include words that may act as synonyms for the word in question or otherwise have the same or similar meanings as the word in question. Both the constructed pattern synonyms 404 and the constructed word synonyms 406 may be generated and/or maintained by the vocabulary modeling service over time. In some embodiments, the constructed pattern synonyms 404 and the constructed word synonyms 406 include word vectors for the word synonyms and the pattern synonyms.

The context processing rules 408 include rules generated by the vocabulary modeling service for how to process the context in which the word is used. The context processing rules 408 may be developed by the vocabulary modeling service as new uses and/or meanings for words, or new words, are used in utterances. For example, the vocabulary modeling service may develop rules for determining when the word "return" is intended as a noun (e.g., "I submitted my tax return today") or a verb (e.g., "I would like to return this pair of shoes that I bought"). The context processing rules 408 may be used to determine which of the known meanings for a word is intended, as well as how to determine an intended meaning for a word that does not comport with one of the known meanings for a word. Further, the context processing rules 408 may be used to determine an intended meaning for a new word based on context. In addition to generating new rules or modifying existing rules, the context processing rules 408 may also include combining multiple rules to process context of word usage.

The null word rules 410 include rules for determining meanings for words that cannot otherwise be determined via disambiguation and/or other word vector techniques based on data in the base meaning repository, context, etc. For example, the null word rules 410 may include rules for deriving a word vector for a word based on the surrounding words. For example, if the base word vector database was learned via contextual approaches (i.e., learning a new word or a new meaning for an existing word based on the words that frequently surround it or predicting what words typically surround a word, or any other statistical method measuring co-occurrence of a word and its surrounding context), then the null word placeholder can be generated based on the word vectors of the surrounding words in an utterance. Alternatively, a model can be trained to directly generate word vectors given known word-surface-form-as-an-ordered-collection-of-characters to vector mappings (e.g., use a pre-existing word vector database as training data to derive an ML model that can be consulted to generate word vectors given an ordered collection of characters).

Figure 11:
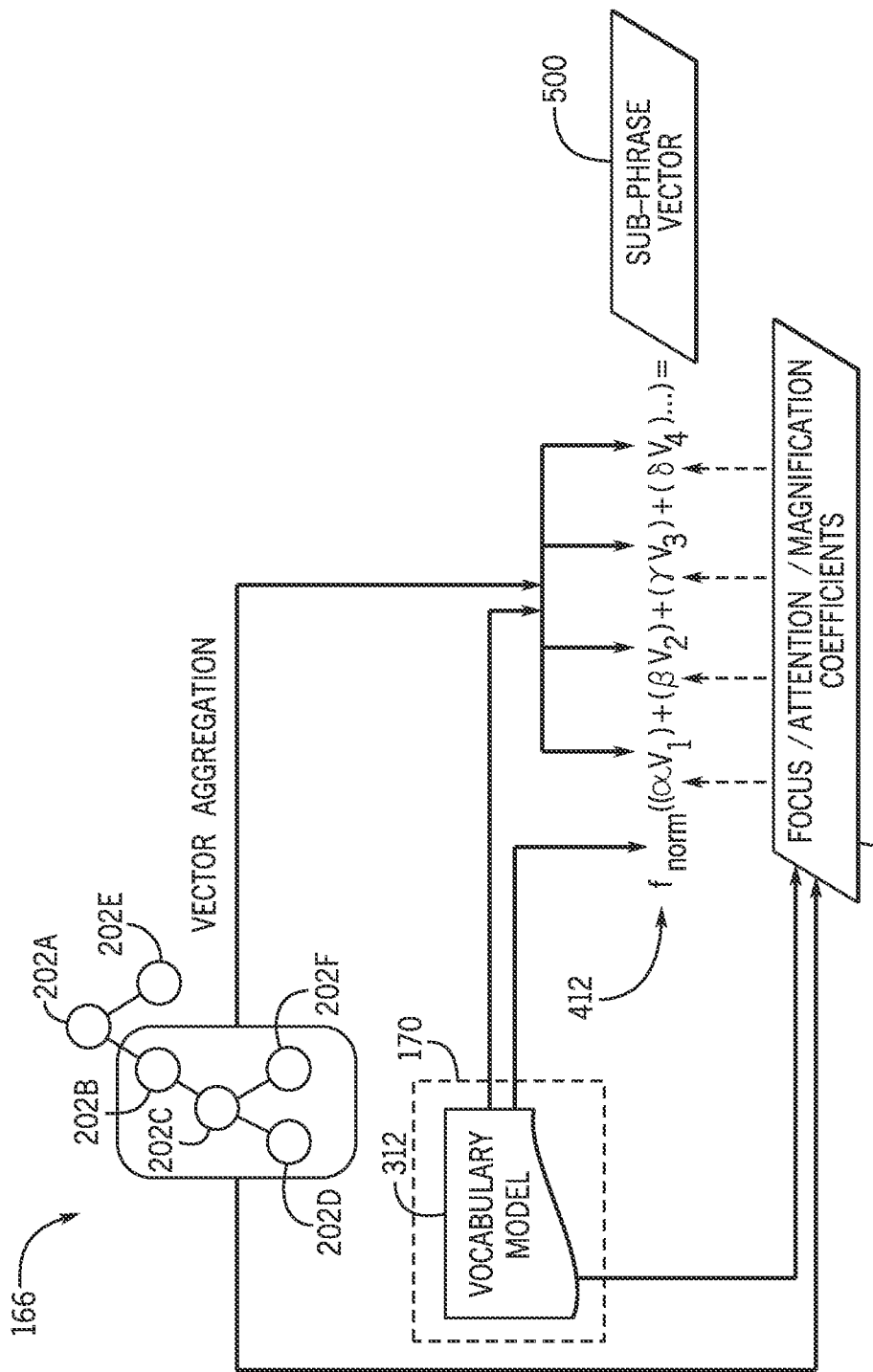
FIG. 11 is a block diagram illustrating example operation of an embodiment of a multi-vector aggregation algorithm to generate a combined subphrase vector for a subtree of an annotated utterance tree, in accordance with aspects of the present techniques.

The multi-vector aggregation algorithms 412 include one or more algorithms for deriving a single word vector from a collection of word vectors. For example, FIG. 11 illustrates how a multi-vector aggregation algorithm 412 combines multiple word vectors into a single sub-phrase vector 500. As shown in FIG. 11, the vocabulary model 312 of the vocabulary subsystem 170 provides word vectors for each node 202 of an annotated utterance tree 166. For the illustrated embodiment, the vocabulary subsystem 170 generated four or more word vectors, represented as $V_1$, $V_2$, $V_3$, and $V_4$, which are respectively associated with four nodes of the annotated utterance tree 166. That is, in certain embodiments, the NLU framework may modify the annotated utterance tree 166 (e.g., the vocabulary subsystem 170 may replace phrases including multiple word vectors with individual words or subphrases having single word vectors). As such, it is appreciated that, at one or more stages of intent/entity extraction, the number of nodes/subtrees of the annotated utterance tree 166 may be increased or decreased, along with the number of word vectors combined to calculate the subphrase vector 500, relative to an original utterance or an initially generated annotated utterance tree 166. In other embodiments, the multi-vector aggregation algorithm 412 may be used to generate a single word vector 500 from a group of synonyms by using weighted average.

As shown in FIG. 11, the multi-vector aggregation algorithm 412 generates the subphrase vector 500 by multiplying each of the word vectors by a respective focus/attention/magnification (FAM) coefficient 502 (e.g., $\alpha$, $\beta$, $\gamma$, $\delta$) associated with the word vector. The FAM coefficients 502 are used to tune how much relative focus or attention (e.g., signal magnification) should be granted to each portion (e.g., node) of a subtree when generating a subphrase vector 500. Accordingly, the FAM coefficients 270 increase or decrease the contribution of each word vector to the combined subphrase vector 500. After applying the FAM coefficients 502 to the word vectors $V_{1-4}$, the results are combined using vector addition, as indicated by the "+" notation in FIG. 11. Additionally, for the illustrated embodiment, the resulting subphrase vector 500 is subsequently normalized to ensure that the dimensions of the combined subphrase vector 500 are each within a suitable range after the multiplication and addition operations. It may be noted that the tree substructure vectorization algorithm 412 illustrated in FIG. 11 is merely provided as an example, and in other embodiments, other suitable tree substructure vectorization algorithms may be used, in accordance with the present disclosure. In some embodiments, the vector aggregation may be performed iteratively (e.g., via class-level component comparisons). In other embodiments, a general signal for all nodes in the tree or sub-tree may be requested and used for vector aggregation.

By way of example, in certain embodiments, verb words or subtrees may be associated with one of the FAM coefficients 502 (e.g., $\alpha$) that is greater in value than another FAM coefficient (e.g., $\beta$) associated with a subject or direct object word or subtree vector. In certain embodiments, root node word vectors may be associated with a relatively higher FAM coefficient 502 than word vectors associated with other nodes. In certain embodiments, the combined subphrase vector 500 is a centroid that is calculated as the weighted average of the word vectors associated with all nodes of the subtree. In other embodiments, the meaning extraction subsystem 150 may recursively perform vector aggregation. In certain embodiments, one or more of the vectors (e.g., $V_1$, $V_2$, $V_3$, and $V_4$) that are used to generate the combined subphrase vector 500 may itself be a combined subphrase vector 500 that is generated from other underlying word and/or subtree vectors. For such embodiments, subtrees with at least one depending node (e.g., non-leaf nodes/subtrees) may be associated with a higher FAM coefficient value than single-node (e.g., a leaf nodes/subtrees).

Figure 12:
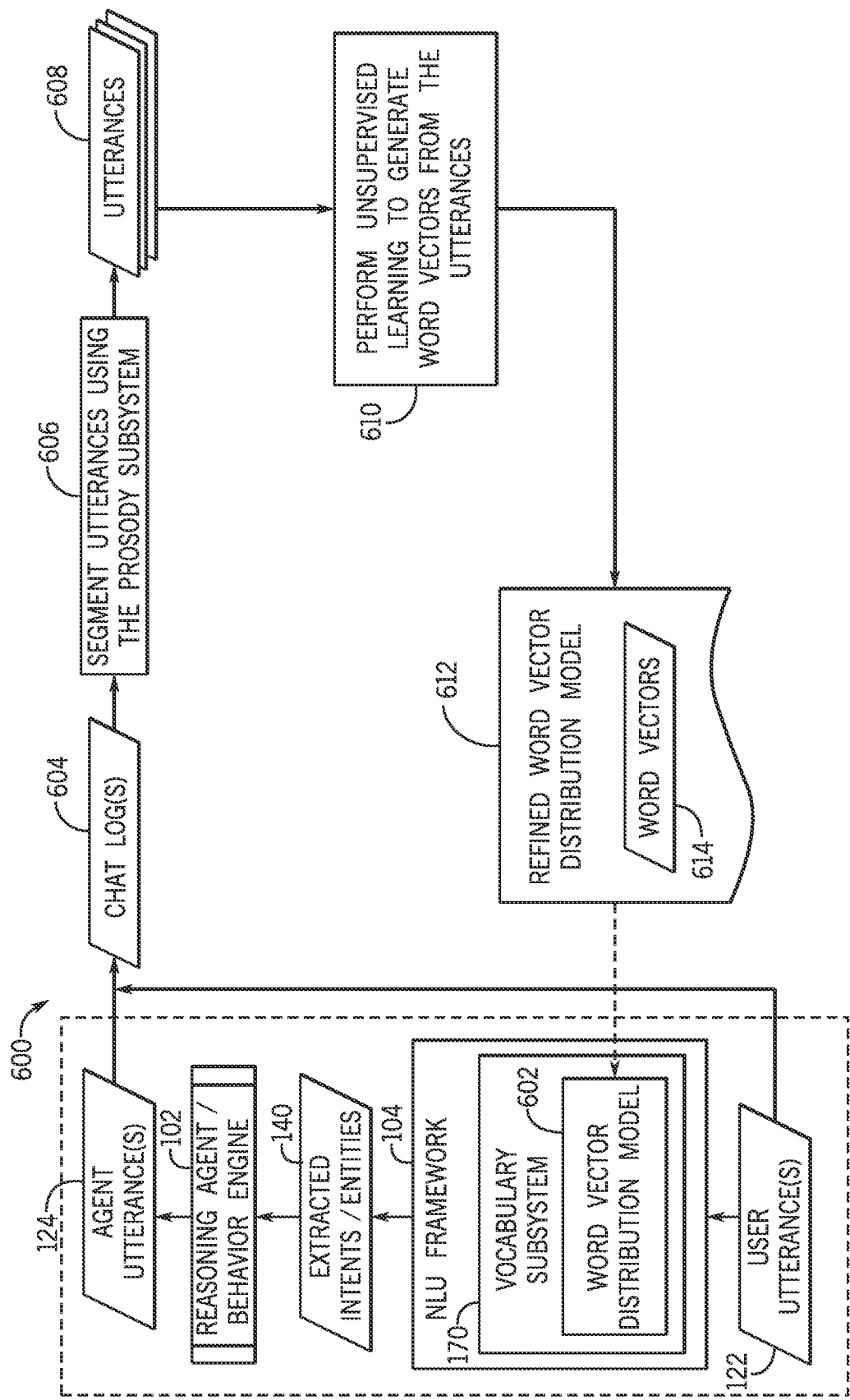
FIG. 12 is a flow diagram illustrating how the agent automation framework continuously improves a word vector distribution model, which may be plugged into the vocabulary subsystem of the meaning extraction subsystem shown in FIG. 7, in accordance with aspects of the present techniques.

Returning to FIG. 7, as the virtual agent communicates with users (e.g., receives, processes, and responds to utterances) data may be generated and collected to further train the system to learn new words and/or refine word understandings. For example, the agent automation system 100 can continue to learn or infer meaning of new words and phrases. It is presently recognized that this can enable the agent automation system 100 to have a continuously expanding/adapting vocabulary capable of accommodating the use of unfamiliar words, as well as changes to the meaning of familiar words. For example, FIG. 12 is a flow diagram illustrating an embodiment of a process 600 whereby the agent automation system 100 continuously improves a word vector distribution model 602, which may be plugged into the structure subsystem 172 of the meaning extraction subsystem 150, such as the learned multimodal word vector distribution model 178 or the learned unimodal word vector distribution model 180 discussed above with respect to FIG. 7. As such, it is appreciated that, by expanding or modifying the word vector distribution model 602, operation of the vocabulary subsystem 170, the NLU framework 104, and the agent automation system 100 can be improved to handle words with new or changing meanings using only training data that can be generated from a continually growing corpus of utterances 112 of the database 106 illustrated in FIG. 4A. For the embodiment illustrated in FIG. 12, the corpus of utterances 112 may be, for example, a collection of chat logs 604 storing user utterances 122 and agent utterances 124 from various chat room exchanges, or other suitable source data.

For the embodiment illustrated in FIG. 12, prior to operation of the agent automation system 100, the word vector distribution model 602 may initially be generated based on a first corpus of utterances that have a particular diction and vocabulary, such as a set of books, newspapers, periodicals, and so forth. However, it is appreciated that many utterances exchanges in different conversational channels (e.g., chat rooms, forums, emails) may demonstrate different diction, such as slang terms, abbreviated terms, acronyms, and so forth. With this in mind, the continual learning loop illustrated in FIG. 12 enables the word vector distribution model 602 to be modified to include new word vectors, and to change values of existing word vectors, based on source data gleaned from the growing collections of user and agent utterances 122 and 124, to become more adept at generating annotated utterance trees 166 that include these new or changing terms.

The process 600 illustrated in FIG. 12 includes receiving and responding to the user utterance 122, as discussed above with respect to FIG. 5. As mentioned, the user utterances 122 and the agent utterances 124 can be collected to populate the corpus of utterances 112 (e.g., chat logs 604) stored in the database 106, as illustrated in FIG. 4A. As some point, such as during regularly scheduled maintenance, the prosody subsystem 174 of the meaning extraction subsystem 150 segments (block 606) the chat logs 604 into distinct utterances 608 that are ready for analysis. Then, in block 610, the meaning extraction subsystem 150 performs rule-augmented unsupervised learning to generate a refined word vector distribution model 612 containing new or different word vectors 614 generated from the segmented utterances 608.

For example, as discussed above, the meaning extraction subsystem 150 may analyze the set of segmented utterances 608 and determine word vectors 614 for the words of these utterances based on how certain words tend to be used together. For such embodiments, two words that are frequently used in similar contexts within these utterances 608 are considered closely related and, therefore, are assigned a similar vector value (e.g., relatively closer in terms of Euclidean distance) in one or more dimensions of the word vectors 614. In this manner, the meaning extraction subsystem 150 may adapt to changes in the meaning of a previously understood term based on new context in which the term is used. Accordingly, the agent automation system 100 may parse the chat logs 604 to evaluate how a word or phrase is used in the chat logs 604 and determine whether the usage is represented by one or more associated word vectors 614 of the word vector distribution model 612. This may include, for example, considering the context in which the word or phrase is used to determine the intended meaning of the word, as described below with regard to FIG. 13. If not, the word vector distribution model 612 may be updated to add one or more new word vectors 614 representative of the new meaning, or replace one or more existing vectors 614 to match the new meaning.

As illustrated in FIG. 12, the redefined word vector distribution model 612 is used to replace the existing word vector distribution model 602, such that the vocabulary subsystem 170 can use this redefined model to provide word vectors for the words and phrases of new user utterances 122 received by the agent automation system 100. For example, an initial word vector distribution model 602 may have a word vector for the term "Everest" that is relatively close in one or more dimensions to other word vectors for terms such as, "mountain", "Himalayas", "peak", and so forth. However, when a client creates a new conference room that is named "Everest," the term begins to be used in a different context within user utterances 122. As such, in block 610, a new word vector would be generated for the term "Everest" that would be relatively close in one or more dimensions to word vectors for terms such as "conference", "meeting", "presentation", and so forth. After updating the word vector distribution model 612, upon receiving a user utterance 122 having the revised term "Everest," the operation of the vocabulary subsystem 170, the NLU framework 104, and the agent automation system 100 is improved to more provide more accurate word vectors, annotated utterance trees, and meaning representations, which result in more accurately extracted intents/entities 140.

Figure 13:
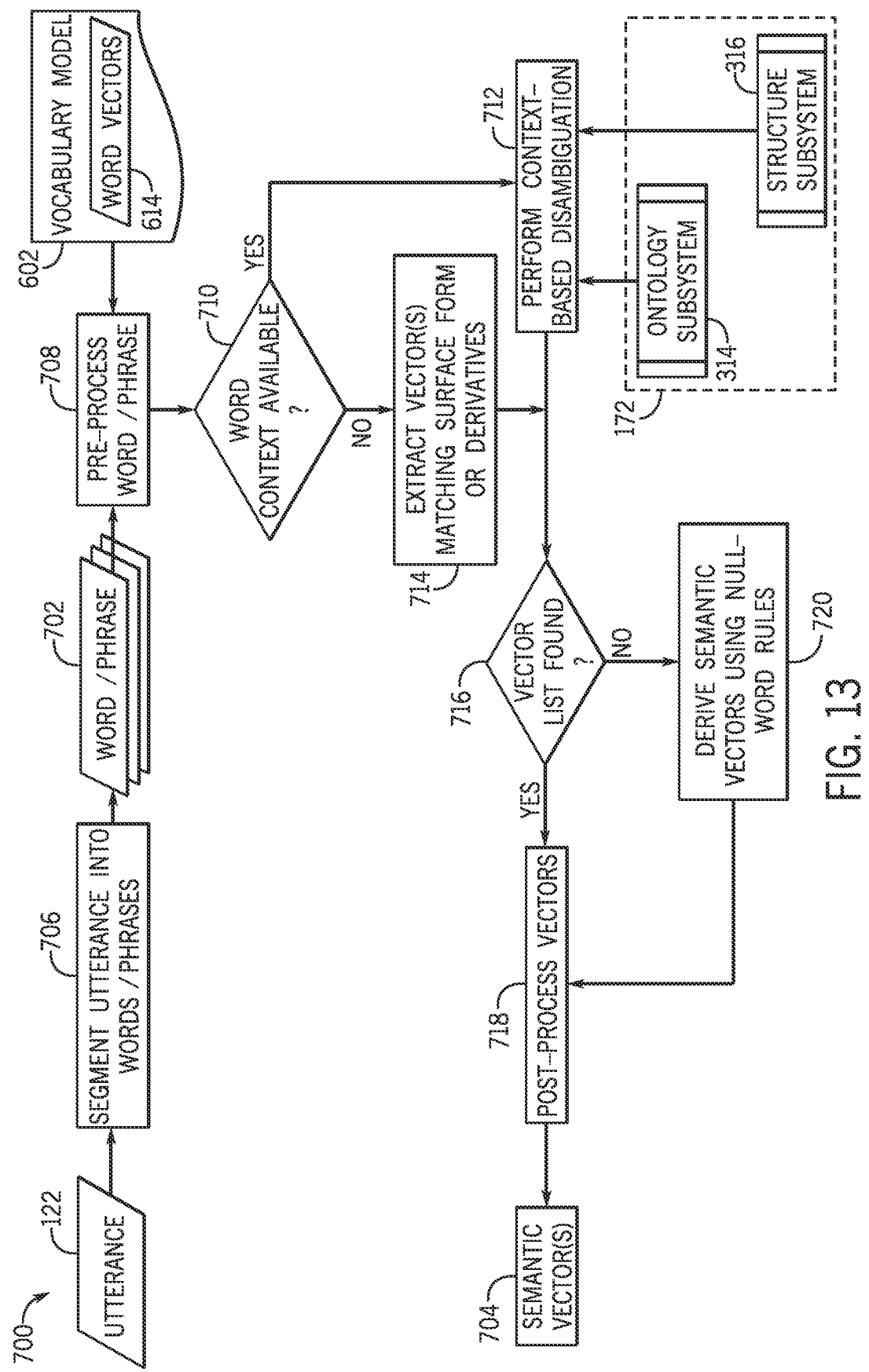
FIG. 13 is a flow diagram illustrating a process for receiving the user utterance, determining which meanings of one or more words or phrases appearing in the utterance were intended, and outputting one or more associated semantic word vectors, in accordance with aspects of the present technique.

As previously described, a word or phrase may be associated with multiple word vectors 614 associated with different meanings of the word. Using the "Everest" example from above, when the term "Everest" is used in a user utterance 122, the user could have intended Mount Everest, the conference room named Everest, or some other meaning. Accordingly, the NLU framework may analyze user utterances 122 to determine which word vectors 614 were intended when a word or phrase appears in an utterance 122. FIG. 13 is a flow chart illustrating a process 700 for receiving a user utterance 122, determining which meanings of one or more words or phrases 702 appearing in the utterance 122 were intended, and outputting one or more associated semantic word vectors 704. At block 709, the utterance 122 is parsed and segmented into words and/or phrases 702. This may include, for example, parsing the utterance 122 and generating an annotated utterance tree as shown and described above with regard to FIGS. 8 and 9, wherein each word or phrase 702 is represented by a node.

At block 708, each word/phrase 702 is pre-processed. Pre-processing may include, for example, applying pre-processing directives or instructions from the vocabulary model 602. These directives or instructions may provide guidance for checking spelling, correcting formatting issues, expanding contractions, expanding abbreviations, replacing acronyms with associated words, as well as other data-cleansing processes.

At decision 710, the system determines whether there is any word context available. If word context is available, the process 700 proceeds to block 712 and performs context-based disambiguation. The surrounding words and/or phrases 702 in the utterance 122 may provide context for determining what meaning of the word or phrase 702 in question was intended. In some embodiments, the ontology service 314 and/or the structure service 316 may be utilized to perform the context-based disambiguation. Returning to the "Everest" example, if the utterance 122 is "I'm not sure, but we have a meeting scheduled in Everest at 2:30 pm this afternoon to discuss what to do", the other words 702 in the utterance 122 may be used to determine that the use of the word "Everest" in the utterance 122 was referring to the conference room. For example, the words "meeting" and reference to a time just a couple of hours in the future, with Mount Everest being thousands of miles away, may signal that Everest the conference room was intended, instead of Mount Everest. However, if the utterance had been "we're just going to Santa Cruz for the weekend, it's not like we're traveling to go climb Everest", the other words 702 in the utterance 122 may be used to determine that the use of the word "Everest" in the utterance 122 was referring to Mount Everest and not the conference room. For example, the words "climb", "traveling" and reference to various destinations, may signal that Mount Everest was intended, instead of Everest the conference room. Once the context-based disambiguation has been performed, word vectors are selected based on the context and extracted.

However, if the utterance 122 in question only includes a single word or phrase 702, the system may determine that there is no context available and proceed to extract one or more vectors matching the surface form or form derivatives (block 714). For example, word vectors for the word or phrase 702 may be selected from the vocabulary model 602 based solely on the surface form used in the utterance 122, or form derivatives. Alternatively, if the utterance 122 in question only includes a single word or phrase 702, the system may refer to other utterances that precede or proceed the utterance in question to determine whether any context is available. For example, the single word or phrase 702 of the utterance 122 may be a single word or phrase answer to a question. As such, considering the question may provide context as to what was meant by the single word or phrase 702 of the utterance 122.

If there are no word vectors associated with the word or phrase 702, then no word vectors are extracted. At decision 716, the process 700 determines whether a vector list has been found (i.e., were any word vectors extracted?). If vectors were extracted in blocks 712 and/or 714, then the process proceeds to block 718 and post-processes the extracted vectors, resulting in the output semantic word vectors 704. For example, the post-processing may include extracting a representative vector or vector set given one or more synonymic vector lists generated during blocks 712 and 714.

However, if no vector word lists have been extracted in blocks 712 and 714, the process 700 proceeds to block 720 and uses null-word rules (e.g., as described with regard to FIG. 10) received from the vocabulary model 602 to generate word vectors 704 for the word or phrase 702. In some embodiments, the when null word rules are used to derive semantic vectors for a word or phrase, the unknown word or phrase may be flagged as an unknown word for future learning, and/or input may be requested from a user to help define the word or phrase. The generated word vectors 704 may then be post-processed (block 718) as described above. The NLU framework 104 may then insert the semantic vectors 704 output by the process 700 shown in FIG. 13 into the annotated utterance tree and use the annotated utterance tree to determine the intent of the utterance 122 and generate a response. In some embodiments, learning may be triggered by one or more conditions. For example, in some embodiments, learning may be triggered by the magnitude of collected data (e.g., when chat logs reach a threshold size). In other embodiments, an unknown word or an unknown meaning for a known word being used a threshold number of times within some window of time may trigger learning. In some embodiments, learning may take place on a scheduled basis (e.g., weekly, monthly, quarterly, annually, etc.). It should be understood, however, that in some embodiments, learning may be triggered by one or more of multiple possible conditions.

Technical effects of the present disclosure include a virtual agent that is capable of learning new words, or new meanings for known words, based on exchanges between the virtual agent and the user in order to customize the vocabulary of the virtual agent to the needs of the user or users. The agent automation framework may have access to a corpus of previous exchanges between the virtual agent and the user, such as one or more chat logs. The agent may segment the chat logs into utterances using the prosody subsystem, and then further segment the utterances into words and/or phrases. The agent automation framework may then recognize when new words and/or new meanings for known words appear in user utterances. New word vectors may be generated for these new words and/or new meanings for known words. The new word vectors may then be added to an existing word vector distribution model to generate a refined word vector distribution model. The new word vector may be generated, for example, based on the context in which the new word or meaning was used over one or more uses in the chat logs, input from a user, or some other source. The NLU framework may then utilize the refined word vector distribution model to interpret and analyze user utterances and generate responses.

When determining the intended meaning for a word used in an utterance that has multiple different meanings and multiple different respective word vectors, the agent automation framework segments the utterance into words and/or phrases. If word usage context is available, the agent automation framework may determine which meaning was intended by performing context-based disambiguation via the ontology service and/or the structure service. If no context is available, the agent automation framework may extract word vectors matching the surface form or form derivatives. If no word vectors are found, the agent automation framework derives semantic word vectors according to null-word rules. As time passes and the virtual agent exchanges utterances with the user, the virtual agent learns new words, or new meanings for known words, and thus customizes its vocabulary to its specific application and users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
   a memory configured to store a natural language understanding (NLU) framework, wherein the NLU framework includes a vocabulary model and a prosody subsystem;
   a processor configured to execute instructions to cause the NLU framework to perform actions comprising:
   receiving a user utterance;
   applying the prosody subsystem to segment the user utterance into a plurality of phrases based on written prosody cues of the user utterance, wherein the written prosody cues comprise rhythm, emphasis, or linguistic style within the user utterance; and
   for each phrase of the plurality of phrases:
   determining whether context is available for the phrase;

in response to determining that context is available for the phrase, performing context-based disambiguation of the phrase and then attempting to determine a respective vector for the disambiguated phrase in the vocabulary model;

in response to determining that context is not available for the phrase, attempting to determine the respective vector for the phrase in the vocabulary model based on a surface form of the phrase; and in response to determining that the respective vector has not been located for the phrase, applying a null word rule to attempt to determine the respective vector for the phrase.

2. The system of claim 1, wherein a particular phrase of the plurality of phrases includes a single word of the user utterance, and the respective vector of the particular phrase is a word vector that represents the single word in a semantic vector space of the vocabulary model.

3. The system of claim 1, wherein a particular phrase of the plurality of phrases includes a plurality of words of the user utterance, wherein determining the respective vector comprises applying a multi-vector aggregation algorithm of the vocabulary model, and wherein the respective vector of the particular phrase is a subphrase vector that is a multi-vector aggregation of word vectors representing the plurality of words in a semantic vector space of the vocabulary model.

4. The system of claim 3, wherein the multi-vector aggregation algorithm aggregates the word vectors using focus/attention/magnification (FAM) coefficients of the NLU framework.

5. The system of claim 1, wherein performing the context-based disambiguation of the phrase comprises applying context processing rules of the NLU framework.

6. The system of claim 1, wherein performing the context-based disambiguation of the phrase comprises applying a structure service and an ontology service of the NLU framework, wherein the structure service is configured to extract a linguistic structure of the phrase and the ontology service is configured to access a lexical database to determine a disambiguated form of the phrase based on the extracted linguistic structure.

7. The system of claim 1, wherein applying the null word rule comprises determining the respective vector for the phrase by aggregating word vectors of words surrounding the phrase in the user utterance.

8. The system of claim 1, wherein applying the null word rule comprises using a trained machine-learning (ML) model to determine the respective vector from an ordered collection of characters of the phrase.

9. A method of operating a natural language understanding (NLU) framework, comprising:

receiving a user utterance;

applying a prosody subsystem of the NLU framework to segment the user utterance into a plurality of phrases based on written prosody cues of the user utterance; and for each phrase of the plurality of phrases:
determining whether context is available for the phrase;
in response to determining that context is available for the phrase, performing context-based disambiguation of the phrase and then attempting to determine a respective vector for the disambiguated phrase in a vocabulary model of the NLU framework;
in response to determining that context is not available for the phrase, attempting to determine the respective vector for the phrase in the vocabulary model based on a surface form of the phrase; and
in response to determining that the respective vector has not been located for the phrase, applying a null word rule to attempt to determine the respective vector for the phrase;

wherein determining the respective vector for the phrase or the disambiguated phrase in the vocabulary model comprises applying a multi-vector aggregation algorithm of the vocabulary model to aggregate word vectors representing words of the phrase or the disambiguated phrase into a subphrase vector.

10. The method of claim 9, wherein the subphrase vector is a multi-vector aggregation of the word vectors, and wherein the multi-vector aggregation algorithm aggregates the word vectors using focus/attention/magnification (FAM) coefficients.

11. The method of claim 9, wherein performing the context-based disambiguation of the phrase comprises applying context processing rules of the NLU framework, wherein the context processing rules comprise a rule that determines a part of speech of a portion of the phrase.

12. The method of claim 9, wherein the written prosody cues comprise rhythm, emphasis, linguistic style, or a combination thereof, within the user utterance.

13. The method of claim 9, wherein applying the null word rule comprises determining the respective vector for the phrase by aggregating word vectors of words surrounding the phrase in the user utterance.

14. The method of claim 9, wherein applying the null word rule comprises using a trained machine-learning (ML) model to determine the respective vector for the phrase, wherein the ML model is configured and trained to receive an ordered collection of characters of the phrase as input and to provide the respective vector for the phrase as output.

15. A non-transitory, computer-readable medium storing instructions of a natural language understanding (NLU) framework that are executable by one or more processors of a computing system, wherein the instructions comprise instructions to:

receive a user utterance;

apply a prosody subsystem of the NLU framework to segment the user utterance into a plurality of phrases based on written prosody cues of the user utterance; and for each phrase of the plurality of phrases:
determine whether context is available for the phrase;
in response to determining that context is available for the phrase, perform context-based disambiguation of the phrase using a structure service and an ontology service of the NLU framework and then attempt to determine a respective vector for the disambiguated phrase in a vocabulary model of the NLU framework, wherein the structure service is configured to extract a linguistic structure of the phrase and the ontology service is configured to access a lexical database to determine a disambiguated form of the phrase based on the extracted linguistic structure;
in response to determining that context is not available for the phrase, attempt to determine the respective vector for the phrase in the vocabulary model based on a surface form of the phrase; and
in response to determining that the respective vector has not been located for the phrase, apply a null word rule to attempt to determine the respective vector for the phrase.

16. The medium of claim 15, wherein a particular phrase of the plurality of phrases includes a plurality of words of the user utterance, wherein the instructions to determine the respective vector comprise instructions to apply a multi-vector aggregation algorithm of the vocabulary model, wherein the respective vector of the particular phrase is a subphrase vector that is a multi-vector aggregation of word vectors representing the plurality of words, and wherein the multi-vector aggregation algorithm aggregates the word vectors using focus/attention/magnification (FAM) coefficients.

17. The medium of claim 15, wherein the instructions to apply the null word rule comprise instructions to use a trained machine-learning (ML) model to determine the respective vector for the phrase, wherein the ML model is configured and trained to receive an ordered collection of characters of the phrase as input and to provide the respective vector for the phrase as output.

* * * * *